(12) United States Patent
Hayashi et al.

(10) Patent No.: US 10,315,511 B2
(45) Date of Patent: Jun. 11, 2019

(54) VEHICLE

(71) Applicant: YAMAHA HATSUDOKI KABUSHIKI KAISHA, Iwata-shi, Shizuoka (JP)

(72) Inventors: Tomoyuki Hayashi, Shizuoka (JP); Masahide Shinbori, Shizuoka (JP); Keisuke Imura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/027,409

(22) Filed: Jul. 5, 2018

(65) Prior Publication Data

US 2019/0061518 A1    Feb. 28, 2019

(30) Foreign Application Priority Data

Aug. 22, 2017 (JP) .................. 2017-159745

(51) Int. Cl.
| | |
|---|---|
| *B60K 15/035* | (2006.01) |
| *B60K 15/063* | (2006.01) |
| *B60K 15/03* | (2006.01) |
| *F02M 37/00* | (2006.01) |
| *F02M 35/16* | (2006.01) |
| *F02M 25/08* | (2006.01) |

(52) U.S. Cl.
CPC .......... *B60K 15/063* (2013.01); *B60K 15/03* (2013.01); *B60K 15/03504* (2013.01); *F02M 35/162* (2013.01); *F02M 37/007* (2013.01); *F02M 37/0023* (2013.01); *B60K 2015/03256* (2013.01); *B60K 2015/0632* (2013.01); *B60K 2015/0637* (2013.01); *F02M 25/089* (2013.01)

(58) Field of Classification Search
CPC ................. B60K 15/063; B60K 15/03; B60K 15/03504; B60K 2015/0632; B60K 2015/03256; B60K 2015/0637; F02M 35/162; F02M 37/0023; F02M 37/007; F02M 25/089
See application file for complete search history.

(56) References Cited

U.S. PATENT DOCUMENTS

| | | | | |
|---|---|---|---|---|
| 6,029,635 A | * | 2/2000 | Sekine ................. | B60K 15/035 123/516 |
| 6,306,190 B1 | * | 10/2001 | Tsuruta ............. | B01D 46/0023 123/198 E |
| 2003/0221675 A1 | * | 12/2003 | Washeleski ...... | B60K 15/03504 123/497 |
| 2005/0241609 A1 | * | 11/2005 | Kobayashi ......... | F02M 35/0203 123/198 E |

(Continued)

FOREIGN PATENT DOCUMENTS

JP    2014-141921 A    8/2014

*Primary Examiner* — Erez Gurari
(74) *Attorney, Agent, or Firm* — Keating and Bennett, LLP

(57) ABSTRACT

A vehicle includes a seat, an engine, a fuel tank, a canister connected to the fuel tank via a gas pipe, a breather pipe, and a drainpipe. The fuel tank is located lower than a seat surface of the seat. The canister adsorbs evaporation gas generated by evaporation of fuel inside the fuel tank. The breather pipe includes an inlet connected to the canister, and an outlet located at a higher position than the seat surface of the seat and open to the atmosphere. The drainpipe includes a drain hole located lower than the outlet, and branches from the breather pipe.

20 Claims, 12 Drawing Sheets

(56) References Cited

U.S. PATENT DOCUMENTS

| | | | |
|---|---|---|---|
| 2010/0126476 A1* | 5/2010 | Hidano | F02M 25/089 123/519 |
| 2010/0206272 A1* | 8/2010 | Ishida | F02M 25/089 123/520 |
| 2013/0306628 A1* | 11/2013 | Aso | B60K 15/03504 220/4.14 |
| 2014/0202783 A1 | 7/2014 | Shomura et al. | |
| 2015/0292421 A1* | 10/2015 | Pursifull | F02D 41/004 123/518 |
| 2017/0159617 A1* | 6/2017 | Hamamura | B60K 15/03504 |
| 2017/0292477 A1* | 10/2017 | Kimoto | F02M 37/00 |
| 2017/0356394 A1* | 12/2017 | Murai | F02D 41/0045 |
| 2018/0045127 A1* | 2/2018 | Miura | F02D 41/003 |
| 2018/0163646 A1* | 6/2018 | Tsutsumi | F02D 41/2422 |
| 2018/0179991 A1* | 6/2018 | Oakden-Graus | F02M 25/089 |
| 2018/0179992 A1* | 6/2018 | Morita | B62J 37/00 |
| 2018/0313304 A1* | 11/2018 | Ojima | F02M 35/0201 |
| 2018/0354356 A1* | 12/2018 | Reedy | B60K 15/035 |
| 2019/0061518 A1* | 2/2019 | Hayashi | B60K 15/063 |

* cited by examiner

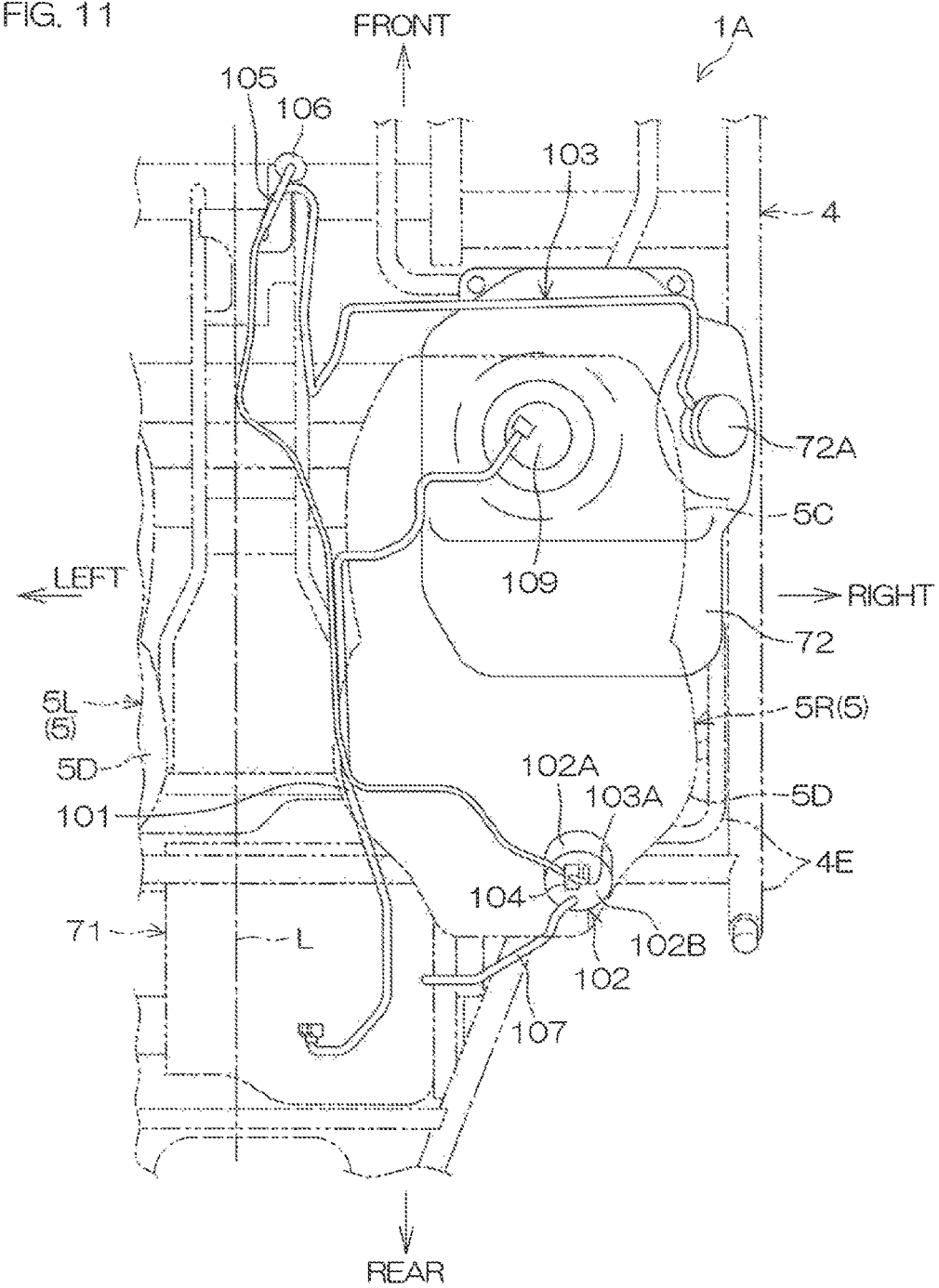

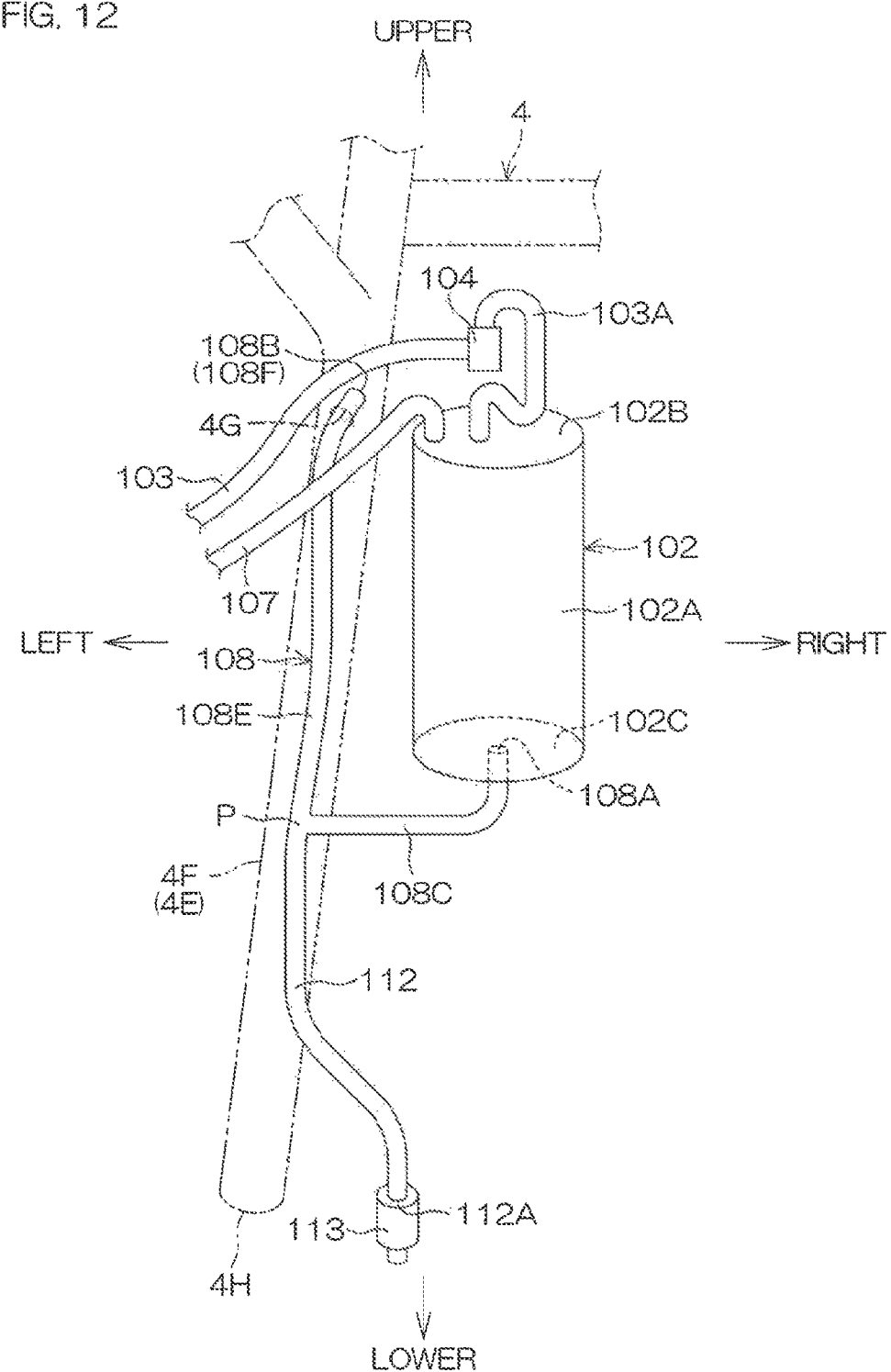

VEHICLE

CROSS REFERENCE TO RELATED APPLICATIONS

This application claims the benefit of priority to Japanese Patent Application No. 2017-159745 filed on Aug. 22, 2017. The entire contents of this application are hereby incorporated herein by reference.

BACKGROUND OF THE INVENTION

1. Field of the Invention

The present invention relates to a vehicle that includes a canister that adsorbs evaporated gas generated by evaporation of fuel inside a fuel tank.

2. Description of the Related Art

A vehicle described in Japanese Patent Application Publication No. 2014-141921 includes a seat supporting frame constituting a portion of a vehicle body frame, a bench seat supported by the seat supporting frame and being long in a vehicle width direction, a fuel tank, and a canister. The fuel tank and the canister are located below the bench seat. The fuel tank and the canister are connected via a purge pipe. Evaporation gas generated inside the fuel tank is guided to the canister through the purge pipe and is adsorbed by the canister. Release of the evaporation gas into the atmosphere is thereby suppressed. Further, an atmosphere open pipe for taking in ambient air is connected to the canister. The canister is supported by a pipe that constitutes a portion of the seat supporting frame. One end of the atmosphere open pipe opens inside this pipe.

It may be assumed that when the vehicle described in Japanese Patent Application Publication No. 2014-141921 crosses a river or travels through a puddle, the seat supporting frame at a lower position than the bench seat would become immersed in water. When the seat supporting frame becomes immersed in water, the canister may degrade in performance due to entry of water into the canister through the pipe of the seat supporting frame and the atmosphere open pipe.

SUMMARY OF THE INVENTION

In order to overcome the previously unrecognized and unsolved challenges described above, preferred embodiments of the present invention provide vehicles each of which includes at least one seat, an engine, a fuel tank that stores fuel for the engine, a canister connected to the fuel tank via a gas pipe, a breather pipe, and a drainpipe. The seat is located such that a plurality of occupants sit side by side in the right-left direction of the vehicle. The fuel tank is located lower than a seat surface of the seat. The canister adsorbs evaporated gas generated by evaporation of the fuel inside the fuel tank. The breather pipe includes an inlet connected to the canister, and an outlet located higher than the seat surface of the seat and open to the atmosphere. The drainpipe includes a drain hole located lower than the outlet, and branches from the breather pipe.

In accordance with a preferred embodiment of the present invention, the breather pipe connected to the canister is open to the atmosphere at the outlet located at the position higher than the seat surface of the seat. It may be assumed that when the vehicle crosses a river or travels through a puddle, water outside the vehicle would enter into the vehicle due to immersion of the vehicle in water. Because the outlet of the breather pipe is at the position higher than the seat surface of the seat as described above, water that has entered into the vehicle is less likely to reach the outlet and the outlet is thus less likely to become immersed in water in comparison to a case in which the outlet is lower than the seat surface of the seat. Entry of water into the canister through the breather pipe is thus significantly reduced or prevented. Degradation of the performance of the canister due to entry of water into the canister is thus significantly reduced or prevented.

In a preferred embodiment of the present invention, the breather pipe extends upward from a branching position with respect to the drainpipe, and the outlet is adjacent to an upper end of the breather pipe. In accordance with this preferred embodiment, the outlet of the breather pipe is reliably located at the position higher than the seat surface of the seat. A possibility of water entering into the canister through the breather pipe when the vehicle becomes immersed in water is thus significantly reduced or prevented in comparison to the case in which the outlet is lower than the seat surface of the seat.

In a preferred embodiment of the present invention, the vehicle further includes an intake passage including an air inlet to supply air taken in from the air inlet to the engine. In this case, the outlet is preferably located at the same or substantially the same height position as the air inlet or a position higher than the height position of the air inlet. The air inlet of the intake passage that supplies air to the engine is generally located higher than an assumed water surface when the vehicle becomes immersed in water. Therefore, the outlet of the breather pipe that is located at the height position equal to or higher than the air inlet is also located higher than the assumed water surface. The possibility of water entering into the canister through the breather pipe when the vehicle becomes immersed in water is thus further significantly reduced or prevented.

In a preferred embodiment of the present invention, the vehicle further includes a check valve that prevents backflow into the drainpipe from the drain hole. In accordance with this preferred embodiment, the check valve is able to prevent water outside the vehicle from flowing from the drain hole into the drainpipe. Flow of water from the drainpipe into the breather pipe is thus significantly reduced or prevented and therefore entry of water from the drainpipe into the canister is able to be avoided.

In a preferred embodiment of the present invention, a lower surface of the canister is located lower than the outlet and higher than the drain hole. Preferably in this case, the inlet of the breather pipe is connected to the lower surface of the canister, the drainpipe extends downward from the branching position with respect to the breather pipe, and the drain hole is located at a lower end of the drainpipe and facing the ground. In accordance with this preferred embodiment, when evaporated gas inside the gas pipe liquefies to become liquid fuel that flows into the canister, the liquid fuel inside the canister flows down inside the breather pipe from the lower surface of the canister and thereafter flows down inside the drainpipe and is drawn off out of the vehicle from the drainpipe.

In a preferred embodiment of the present invention, the vehicle further includes a shutoff valve that shuts off the gas pipe in response to the vehicle tilting by a predetermined angle or more with respect to a vertical direction. In accordance with this preferred embodiment, the shutoff valve is able to prevent the liquid fuel inside the fuel tank from flowing into the canister through the gas pipe when the vehicle tilts by the predetermined angle or more with respect to the vertical direction.

In a preferred embodiment of the present invention, the shutoff valve is located higher than the fuel tank. In accordance with this preferred embodiment, the shutoff valve is able to shut off a flow passage inside the gas pipe before the liquid fuel reaches the shutoff valve when the vehicle tilts by the predetermined angle or more with respect to the vertical direction. Flow of the liquid fuel into the canister is thus significantly reduced or prevented.

In a preferred embodiment of the present invention, the shutoff valve is located higher than the canister. In accordance with this preferred embodiment, the shutoff valve is located at a highest possible position such that the shutoff valve reliably shuts off the flow passage inside the gas pipe before the liquid fuel reaches the shutoff valve from the fuel tank when the vehicle tilts by the predetermined angle or more with respect to the vertical direction.

In a preferred embodiment of the present invention, the shutoff valve is located higher than the seat surface of the seat. In accordance with this preferred embodiment, the shutoff valve is located at a high position such that the shutoff valve reliably shuts off the flow passage inside the gas pipe before the liquid fuel reaches the shutoff valve from the fuel tank when the vehicle tilts by the predetermined angle or more with respect to the vertical direction.

In a preferred embodiment of the present invention, the vehicle further includes a purge pipe connected to the canister to supply evaporated gas inside the canister to the engine. In accordance with this preferred embodiment, during engine operation, air inside the purge pipe is drawn in by the engine, ambient air is thus drawn in from the breather pipe, and the ambient air is supplied to the canister. Fuel adsorbed by the canister is released into the ambient air to become evaporated gas that is supplied to the engine via the purge pipe and purged by the engine. The fuel adsorbed by the canister is thus able to be used for operation of the engine.

In a preferred embodiment of the present invention, at least a portion of the fuel tank overlaps with the seat in a plan view of the vehicle. In accordance with this preferred embodiment, locating of at least a portion of the fuel tank directly below the seat provides a vehicle having small dimensions in a front-rear direction and a right-left direction. Entry of water into the canister is significantly reduced or prevented in a vehicle having such a compact arrangement.

In a preferred embodiment of the present invention, the engine is located at a center or substantially a center of the vehicle in the right-left direction, which corresponds to a vehicle width direction, at a position lower than the seat surface of the seat. In accordance with this preferred embodiment, locating the engine at the position lower than the seat surface of the seat secures a wide riding space inside the vehicle. Locating the engine, which is a heavy object, at or substantially at the width direction center of the vehicle improves the motion performance of the vehicle. Entry of water into the canister is significantly reduced or prevented while also securing a wide riding space and a high motion performance.

In a preferred embodiment of the present invention, the vehicle further includes a cylindrical frame including an opening and defining a vehicle body. In this case, the outlet is preferably located inside the cylindrical frame. In accordance with this preferred embodiment, evaporated gas that is not adsorbed inside the canister and passes through the breather pipe to arrive at the outlet thereof flows out from the outlet into the cylindrical frame and is drawn off out of the vehicle from the opening of the cylindrical frame.

In a preferred embodiment of the present invention, the vehicle further includes a dash panel, located farther forward than a backrest of the seat and covering a portion of the breather pipe from the rear. In accordance with this preferred embodiment, a portion of the breather pipe is hidden from view by the dash panel, thus preventing touching of the breather pipe by an occupant seated on the seat. Therefore, a position of the breather pipe, especially the position of the outlet thereof is not changed inadvertently and the outlet is thus reliably located at the position higher than the seat surface of the seat.

In a preferred embodiment of the present invention, the dash panel covers at least a portion of the cylindrical frame from the rear. In accordance with this preferred embodiment, at least a portion of the cylindrical frame is hidden from view by the dash panel, thus preventing touching of the outlet of the breather pipe inside the cylindrical frame by an occupant seated on the seat. Therefore, the position of the outlet of the breather pipe is not changed inadvertently and the outlet is thus reliably located at the position higher than the seat surface of the seat.

In a preferred embodiment of the present invention, the seat includes two seats aligned in the right-left direction and the vehicle further includes a center console located between the two seats and covering a portion of the breather pipe from above. In accordance with this preferred embodiment, a portion of the breather pipe is hidden from view by the center console, thus preventing touching of the breather pipe by an occupant seated on a seat.

In a preferred embodiment of the present invention, the center console covers the canister from above. In accordance with this preferred embodiment, the canister is hidden from view by the center console, thus preventing touching of the canister by an occupant seated on a seat.

In a preferred embodiment of the present invention, the engine is aligned with the fuel tank in the right-left direction which is the width direction of the vehicle. In accordance with this preferred embodiment, aligning the fuel tank and the engine in the right-left direction provides a vehicle having a small dimension in the front-rear direction.

In a preferred embodiment of the present invention, the canister is located farther rearward than a backrest of the seat. In accordance with this preferred embodiment, the canister is located at a position that is unlikely to be reached by a hand of an occupant seated on a seat, thus preventing touching of the canister by the occupant seated on the seat.

In a preferred embodiment of the present invention, the engine is located farther rearward than the fuel tank. In accordance with this preferred embodiment, a component other than the engine is able to be juxtaposed with the fuel tank in the right-left direction and a component other than the fuel tank is able to be juxtaposed with the engine in the right-left direction.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a schematic partially enlarged plan view of the vicinity of the fuel tank in a vehicle according to another preferred embodiment of the present invention.

FIG. 12 is a schematic partially enlarged perspective view of a vicinity of the canister in a vehicle according to another preferred embodiment of the present invention.

DETAILED DESCRIPTION OF THE PREFERRED EMBODIMENTS

In the preferred embodiments of the present invention described below, front-rear, right-left, and up-down are directions defined based on a viewpoint of a driver sitting on a seat of a vehicle and facing a steering wheel. The right-left direction is a vehicle width direction of the vehicle. Also, the description shall be provided based on a state where the vehicle is on a horizontal plane.

Figure 1:
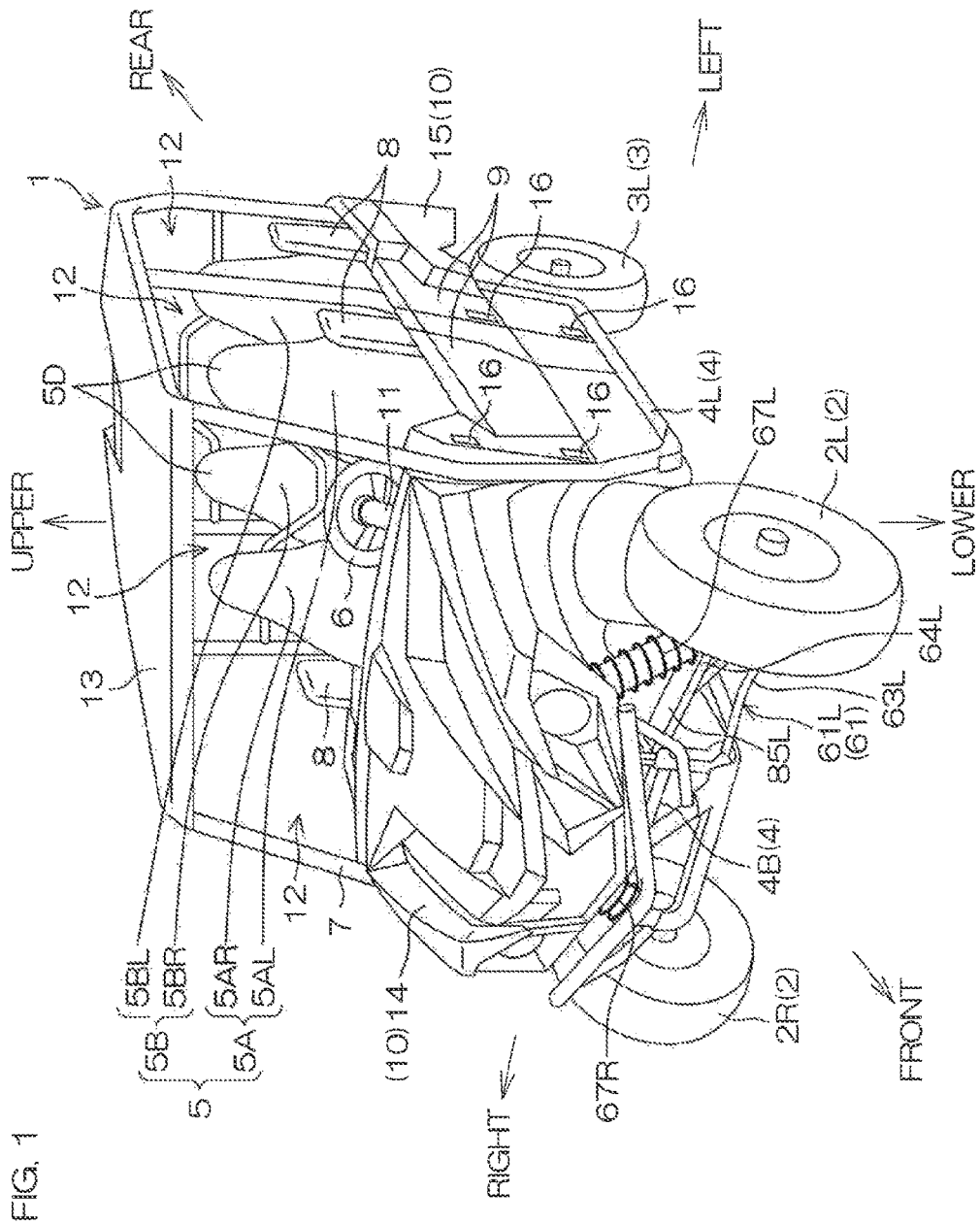
FIG. 1 is a schematic perspective view of a vehicle according to a preferred embodiment of the present invention.

FIG. 1 is a schematic perspective view of the vehicle 1 according to a preferred embodiment of the present invention. The vehicle 1 is preferably a utility vehicle and more specifically is preferably a four-wheel drive, all-terrain vehicle that is called a recreational off-road vehicle and travels through forests, deserts, etc.

The vehicle 1 includes a pair of right and left front wheels 2, a pair of right and left rear wheels 3, a frame 4, at least one seat 5, a steering wheel 6, a roll cage 7, bolsters 8, doors 9, and a body panel 10.

The pair of right and left front wheels 2 include a right front wheel 2R and a left front wheel 2L that are aligned in the right-left direction. The pair of right and left rear wheels 3 include a right rear wheel 3R and a left rear wheel 3L that are aligned in the right-left direction and located farther rearward than the front wheels 2. Each of the left front wheel 2L, right front wheel 2R, left rear wheel 3L, and right rear wheel 3R includes a tire. Recesses and projections in a block pattern to travel on rough terrain may be provided on a surface of each tire. A wheelbase of the vehicle 1 is preferably short and the vehicle width is narrow in order to travel with good maneuverability even in narrow locations such as between trees, etc.

The frame 4 defines a vehicle body of the vehicle 1. The frame 4 is supported by the pair of right and left front wheels 2 and the pair of right and left rear wheels 3. The frame 4 is preferably made of a metal, such as iron or aluminum, etc., and includes an intermediate frame 4A, a left frame 4L, a right frame 4R, a front frame 4B, a rear frame 4C, and an upper frame 4D (see FIG. 2 described below). The left frame 4L is provided at the left of the intermediate frame 4A. The right frame 4R is provided at the right of the intermediate frame 4A. The front frame 4B is provided in front of the intermediate frame 4A. The rear frame 4C is provided at the rear of the intermediate frame 4A. The upper frame 4D is provided above the rear frame 4C.

The vehicle 1 of the present preferred embodiment preferably seats four people, for example. Accordingly, the seats 5 include a pair of right and left front seats 5A and a pair of right and left rear seats 5B. The front seats 5A and the rear seats 5B are respectively located such that a plurality of occupants are seated alongside each other in the right-left direction. The pair of right and left front seats 5A include a right front seat 5AR and a left front seat 5AL that are aligned in the right-left direction. The pair of right and left rear seats 5B include a right rear seat 5BR and a left rear seat 5BL that are aligned in the right-left direction and located farther rearward than the front seats 5A. One of the front seats 5A, for example, the left front seat 5AL is a driver's seat on which the driver sits while facing forward. Each of the seats 5 includes a seat portion 5C and a backrest 5D rising from a rear end of the seat portion 5C, and an upper surface of the seat portion 5C is a seat surface 5E of the seat 5 (see FIG. 3 described below). The seat surface 5E may be a horizontal or substantially horizontal flat surface or may be a downwardly recessed, concave, curved surface. The seat surfaces 5E of the left front seat 5AL and the right front seat 5AR are mutually at the same or substantially the same height position. The seat surfaces 5E of the left rear seat 5BL and the right rear seat 5BR are mutually at the same or substantially the same height position. The seat surfaces 5E of the front seats 5A and the seat surfaces 5E of the rear seats 5B may be at the same or substantially the same height position.

The steering wheel 6 is located in front of the left front seat 5AL. A steering shaft 11 is mounted so as to be rotatable around its axis to the frame 4. The steering wheel 6 is coupled to a rear end of the steering shaft 11.

The roll cage 7 is mounted to the frame 4 and surrounds the pair of front seats 5A and the rear seats 5B. The roll cage 7 defines openings 12, one each at the left of the left front seat 5AL, the right of the right front seat 5AR, the left of the left rear seat 5BL, and the right of the right rear seat 5BR, for boarding and exiting of the occupants. A roof 13 is coupled to an upper portion of the roll cage 7.

The bolsters 8 are plate members made of, for example, resin and one each is provided adjacent to the left of the left front seat 5AL, adjacent to the right of the right front seat 5AR, adjacent to the left of the left rear seat 5BL, and adjacent to the right of the right rear seat 5BR. Each bolster 8 faces the occupant seated on the corresponding seat 5 from the outer side in the right-left direction and helps contain the occupant.

The doors 9 are provided one each at each opening 12, are mounted to the frame 4 via hinges 16, and are able to open and close by swinging around vertical axes. Each of the doors 9 in FIG. 1 is at a closed position and closes a lower region of an opening 12. When an occupant swings a door 9 outward, the door 9 is located at an open position and opens the lower region of an opening 12.

The body panel 10 is made, for example, of resin and is mounted to the frame 4. The body panel 10 includes a front panel 14 covering a front portion of the vehicle 1 farther forward than the front seats 5A, and a rear panel 15 covering a rear portion of the vehicle 1 farther rearward than the rear seats 5B. The doors 9 may define a portion of the body panel 10.

Figure 2:
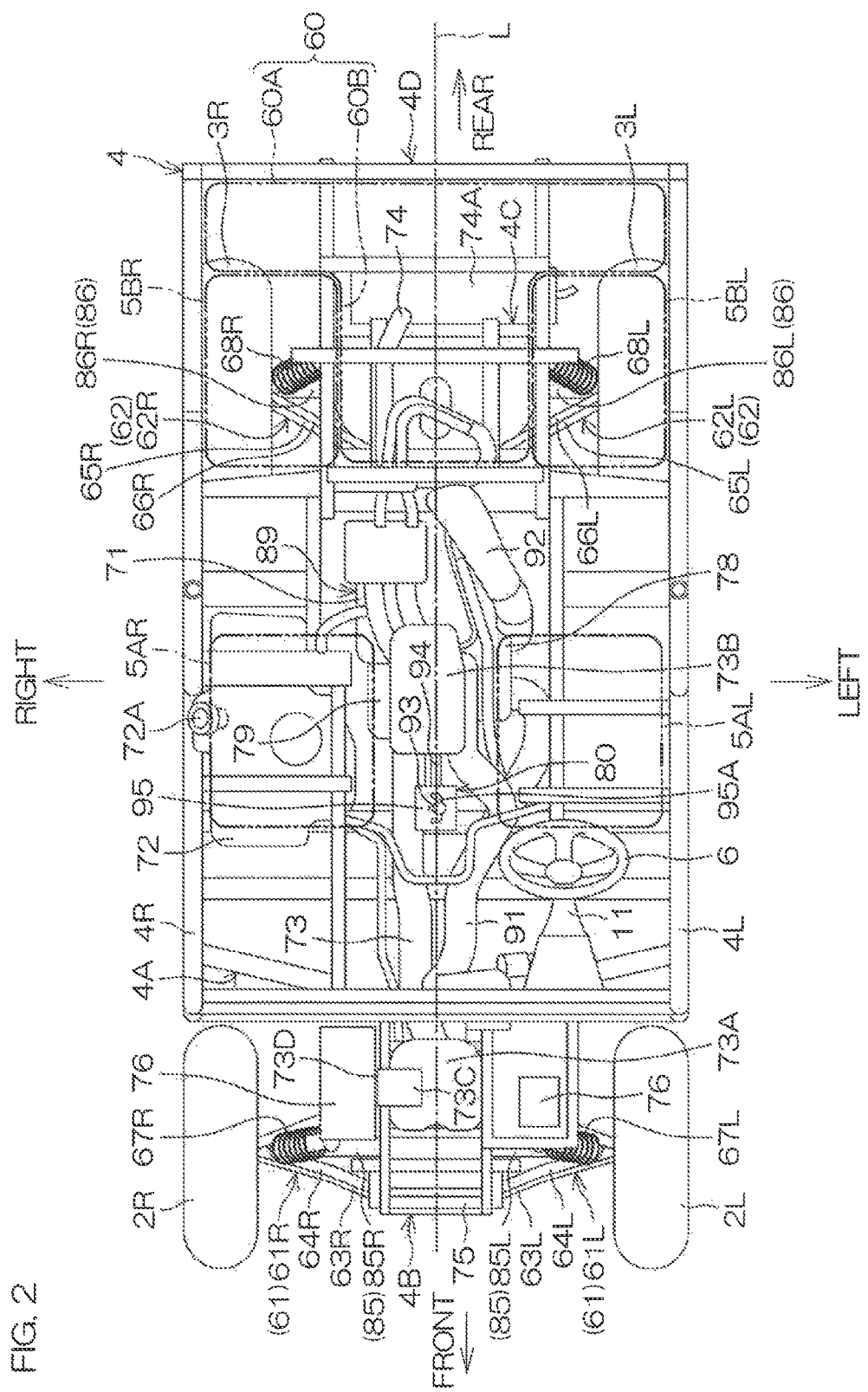
FIG. 2 is a schematic plan view of a vehicle in a state where a roof and a body panel, etc., are removed.

FIG. 2 is a schematic plan view of the vehicle 1 in a state where the roll cage 7, the doors 9, the body panel 10, and the roof 13 are removed.

The vehicle 1 includes a rear deck 60. The rear deck 60 includes a laterally elongated portion 60A located farther rearward than the rear seat 5B, and a projection 60B projecting forward from a center of the laterally elongated portion 60A and located between the left rear seat 5BL and the right rear seat 5BR, and is T-shaped or substantially T-shaped in plan view.

The vehicle 1 includes a pair of right and left front suspensions 61 suspending the pair of right and left front wheels 2 respectively, and a pair of right and left rear suspensions 62 suspending the pair of right and left rear wheels 3 respectively. The pair of right and left front suspensions 61 include a front suspension 61R suspending the right front wheel 2R, and a front suspension 61L suspending the left front wheel 2L. The pair of right and left rear suspensions 62 include a rear suspension 62R suspending the right rear wheel 3R, and a rear suspension 62L suspending the left rear wheel 3L. The frame 4 is supported by the pair of front wheels 2 and the pair of rear wheels 3 via the suspensions 61L, 61R, 62L, and 62R. The suspensions 61L, 61R, 62L, and 62R in the present preferred embodiment are preferably of the double wishbone type.

The front suspension 61L includes a front upper arm 64L and a front lower arm 63L aligned in the up-down direction. The front suspension 61R includes a front upper arm 64R and a front lower arm 63R aligned in the up-down direction. The right and left pair of front lower arms 63R and 63L are an example of front arms according to a preferred embodiment of the present invention. Each of the front lower arms 63L and 63R and the front upper arms 64L and 64R is preferably an A-arm.

A left end of each of the front lower arm 63L and the front upper arm 64L is coupled to a knuckle arm (not shown) of the front wheel 2L. A right end of each of the front lower arm 63R and the front upper arm 64R is coupled to a knuckle arm (not shown) of the front wheel 2R. The front lower arms 63R and 63L and the front upper arms 64R and 64L support the right and left front wheels 2R and 2L. A right end of each of the front lower arm 63L and the front upper arm 64L is mounted to the front frame 4B so as to be swingable up and down. A left end of each of the front lower arm 63R and the front upper arm 64R is mounted to the front frame 4B so as to be swingable up and down.

A lower end of a shock absorber 67L is coupled to a left end portion of the front upper arm 64L, and a lower end of a shock absorber 67R is coupled to a right end portion of the front upper arm 64R. Upper ends of the shock absorbers 67L and 67R are coupled to the front frame 4B.

The rear suspension 62L includes a rear upper arm 66L and a rear lower arm 65L aligned in the up-down direction. The rear suspension 62R includes a rear upper arm 66R and a rear lower arm 65R aligned in the up-down direction. The right and left pair of rear lower arms 65R and 65L are an example of rear arms according to a preferred embodiment of the present invention. Each of the rear lower arms 65L and 65R and the rear upper arms 66L and 66R is preferably an A-arm.

A left end of each of the rear lower arm 65L and the rear upper arm 66L is coupled to a knuckle arm (not shown) of the rear wheel 3L. A right end of each of the rear lower arm 65R and the rear upper arm 66R is coupled to a knuckle arm (not shown) of the rear wheel 3R. The rear lower arms 65R and 65L and the rear upper arms 66R and 66L support the right and left rear wheels 3R and 3L. A right end of the rear lower arm 65L is mounted to the rear frame 4C so as to be swingable up and down. A right end of the rear upper arm 66L is mounted to the frame 4 so as to be swingable up and down. A left end of the rear lower arm 65R is mounted to the rear frame 4C so as to be swingable up and down. A left end of the rear upper arm 66R is mounted to the frame 4 so as to be swingable up and down.

A lower end of a shock absorber 68L is coupled to a left end portion of the rear upper arm 66L, and a lower end of a shock absorber 68R is coupled to a right end portion of the rear upper arm 66R. Upper ends of the shock absorbers 68L and 68R are coupled to the upper frame 4D.

Figure 3:
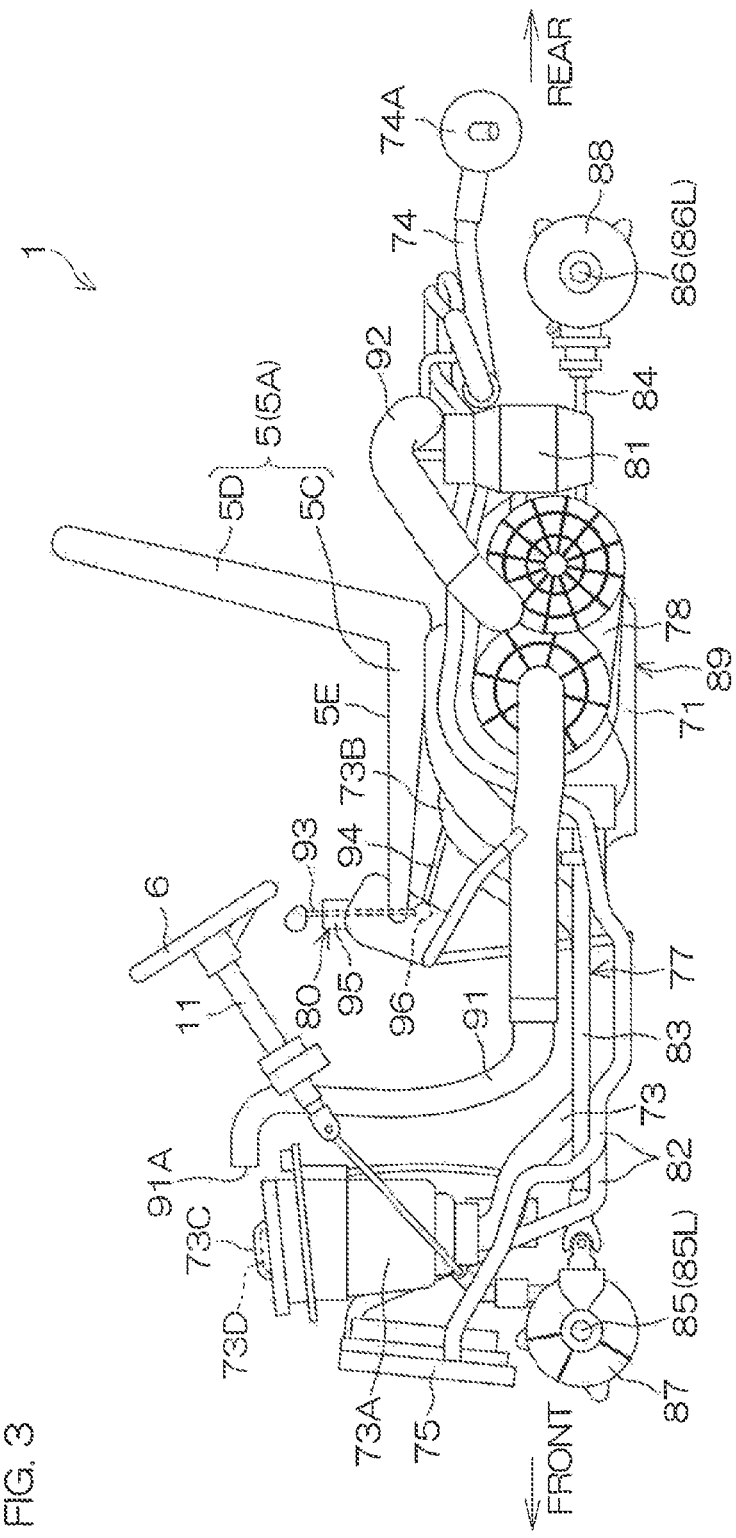
FIG. 3 is a schematic side view of the vehicle in a state where the roof, the body panel, and a frame, etc., are removed.

FIG. 3 is a schematic left side view of the vehicle 1 in a state where the frame 4, the roll cage 7, the doors 9, the body panel 10, the roof 13, etc., are removed. Referring to FIG. 2 and FIG. 3, the vehicle 1 includes an engine 71, a fuel tank 72, an intake passage 73, an exhaust passage 74, a radiator 75, batteries 76, a transmission 77, a continuously variable transmission 78, a shiftable transmission 79, and a shifter 80.

The engine 71 is preferably an internal combustion engine and is, for example, a water-cooled, four-cycle, parallel two-cylinder engine in the present preferred embodiment. The engine 71 is coupled to and supported by the intermediate frame 4A. The engine 71 is located at a center of the vehicle 1 in regard to the right-left direction. Specifically, at least a portion of the engine 71 overlaps with a virtual centerline L passing through the center of the vehicle 1 and extending in the front-rear direction in plan view. At least a front end portion of the engine 71 is located between the two front seats 5A in plan view. The engine 71 is located lower than the seat surfaces 5E of the respective front seats 5A. The engine 71 is, for example, a dry-sump engine, and an oil tank 81 that stores engine oil for the engine 71 is located to the rear of the engine 71.

The fuel tank 72 stores fuel for the engine 71. The fuel for the engine 71 is, for example, gasoline. The fuel tank 72 is located to the right of the engine 71 so as to be aligned with the engine 71 in the right-left direction and is coupled to the intermediate frame 4A. The fuel tank 72 is located lower than the seat surfaces 5E of the respective seats 5A and at least a portion of the fuel tank 72 overlaps with the right front seat 5AR in plan view. A fuel inlet (not shown) and a fuel cap 72A that opens and closes the fuel inlet are provided at a right end portion of an upper surface of the fuel tank 72.

The intake passage 73 extends in the front-rear direction at a location lower than the feet of the occupants seated on the front seats 5. An intake box 73A is provided at a front end portion of the intake passage 73 and an accumulator 73B is provided at a rear end portion of the intake passage 73. The intake box 73A is coupled to the front frame 4B. A projection 73C projects upward from an upper surface of the intake box 73A. An air inlet 73D that takes air into the intake box 73A is provided, for example, in a right surface of the projection 73C. The accumulator 73B is located in front of the engine 71 and is connected to intake ports (not shown) at the respective cylinders of the engine 71 via a throttle body (not shown). Air at a periphery of the intake box 73A is taken into the intake box 73A from the air inlet 73D. The air taken into the intake box 73A is cleaned by passing through a filter (not shown) inside the intake box 73A. The cleaned air continues to flow inside the intake passage 73, arrives at the accumulator 73B, and is supplied to the intake ports at the respective cylinders of the engine 71 via the throttle body.

The exhaust passage 74 extends rearward from exhaust ports (not shown) at the respective cylinders of the engine 71. A muffler 74A is provided at a rear end portion of the exhaust passage 74. The muffler 74A is fixed to the rear frame 4C. Exhaust gas generated in the engine 71 flows through the exhaust passage 74 and is discharged from the muffler 74A.

The radiator 75 is located farther forward than the intake box 73A and is coupled to the front frame 4B. The radiator 75 and the engine 71 are linked via a cooling pipe 82. Cooling water flows through the cooling pipe 82 and is thus circulated between the radiator 75 and the engine 71. The circulated cooling water is cooled when flowing through the radiator 75 and cools the engine 71 when flowing through the engine 71.

The batteries 76 supply electric power to electrical elements (not shown) in the vehicle 1. The batteries 76 are provided, for example, one each at the right and the left of the intake box 73A and are fixed to the front frame 4B.

The transmission 77 includes a front propeller shaft 83, a rear propeller shaft 84, front drive shafts 85, rear drive shafts 86, a front gearing 87, and a rear gearing 88. The front propeller shaft 83 extends forward from the engine 71, and the rear propeller shaft 84 extends rearward from the engine 71. A pair of right and left front drive shafts 85 extend rightward and leftward. Of the pair of front drive shafts 85, a left end of the front drive shaft 85L at the left is linked to the left front wheel 2L and a right end of the front drive shaft 85R at the right is linked to the right front wheel 2R. Similarly, a pair of right and left rear drive shafts 86 extend rightward and leftward. Of the pair of rear drive shafts 86, a left end of the rear drive shaft 86L at the left is linked to the left rear wheel 3L and a right end of the rear drive shaft 86R at the right is linked to the right rear wheel 3R.

The front gearing 87 is coupled to the front frame 4B. The front gearing 87 is supported by the front frame 4B. The front gearing 87 links each of a right end of the front drive shaft 85L and a left end of the front drive shaft 85R to a front end of the front propeller shaft 83. The rear gearing 88 is coupled to the rear frame 4C. The rear gearing 88 is supported by the rear frame 4C. The rear gearing 88 links each of a right end of the rear drive shaft 86L and a left end of the rear drive shaft 86R to a rear end of the rear propeller shaft 84.

The continuously variable transmission 78 is preferably a belt transmission in the present preferred embodiment and is located to a side, and more specifically at the left of the engine 71. The fuel tank 72 located to the right of the engine 71 sandwiches the engine 71 with the continuously variable transmission 78. The shiftable transmission 79 is preferably a gear transmission and is located farther forward than the engine 71. The shiftable transmission 79 is shiftable, for example, to any of three shift stages of high speed, low speed, and reverse. The engine 71, the continuously variable transmission 78, and the shiftable transmission 79 are integral and define a drive unit 89.

An intake duct 91 and an exhaust duct 92 are connected to the continuously variable transmission 78. The intake duct 91 extends in the front-rear direction at a location lower than the feet of the occupants seated on the front seats 5. A front portion of the intake duct 91 is bent upward and a front end portion of the intake duct 91 is bent and extends forward. An air inlet 91A that takes air into the intake duct 91 is provided at a front end of the intake duct 91. The air inlet 91A is at the same or substantially the same height position as the air inlet 73D of the intake box 71A. A rear end portion of the intake duct 91 branches in two and is connected to the continuously variable transmission 78. The exhaust duct 92 extends, for example, rearward and upward from the continuously variable transmission 78. Air taken into the intake duct 91 from the air inlet 91A is guided into the continuously variable transmission 78 by the intake duct 91 and cools an interior of the continuously variable transmission 78. The air inside the continuously variable transmission 78 is discharged through the exhaust duct 92.

The shifter 80 includes an operation lever 93 extending in the up-down direction, a shift rod 94 extending in the forward-rearward direction, and a shift gate 95 holding the operation lever 93. The operation lever 93 is inserted in a groove 95A in the shift gate 95 and is movable forward and rearward along the groove 95A. A lower end of the operation lever 93 and a front end of the shift rod 94 are mutually coupled by a ball joint 96 (see FIG. 3). A rear end of the shift rod 94 is coupled to the shiftable transmission 79. The shift gate 95 is fixed to the intermediate frame 4A. When the driver seated on the left front seat 5AL grips an upper end portion of the operation lever 93 and moves it forward or rearward, a shifting operation force by the driver is input into the shiftable transmission 79 and the shiftable transmission 79 is shifted.

A rotational power of the engine 71 is continuously shifted by the continuously variable transmission 78 and then transmitted to the shiftable transmission 79. The rotational power transmitted to the shiftable transmission 79 is shifted at a shift ratio of a shift stage among high speed, low speed, and reverse by the shiftable transmission 79 and then transmitted to the front propeller shaft 83 and the rear propeller shaft 84. The rotational power transmitted to the front propeller shaft 83 is transmitted to the front gearing 87. The front gearing 87 transmits the rotational power to the front drive shafts 85L and 85R. The rotational power is thus transmitted to the right and left front wheels 2. The rotational power transmitted to the rear propeller shaft 84 is transmitted to the rear gearing 88. The rear gearing 88 transmits the rotational power to the rear drive shafts 86L and 86R. The rotational power is thus transmitted to the right and left rear wheels 3. The front gearing 87 of the present preferred embodiment includes a differential gear and transmits the rotational power from the front propeller shaft 83 to the front drive shafts 85L and 85R while allowing a rotational difference between the front drive shafts 85L and 85R. The rear gearing 88 may or may not include a differential gear.

Figure 4:
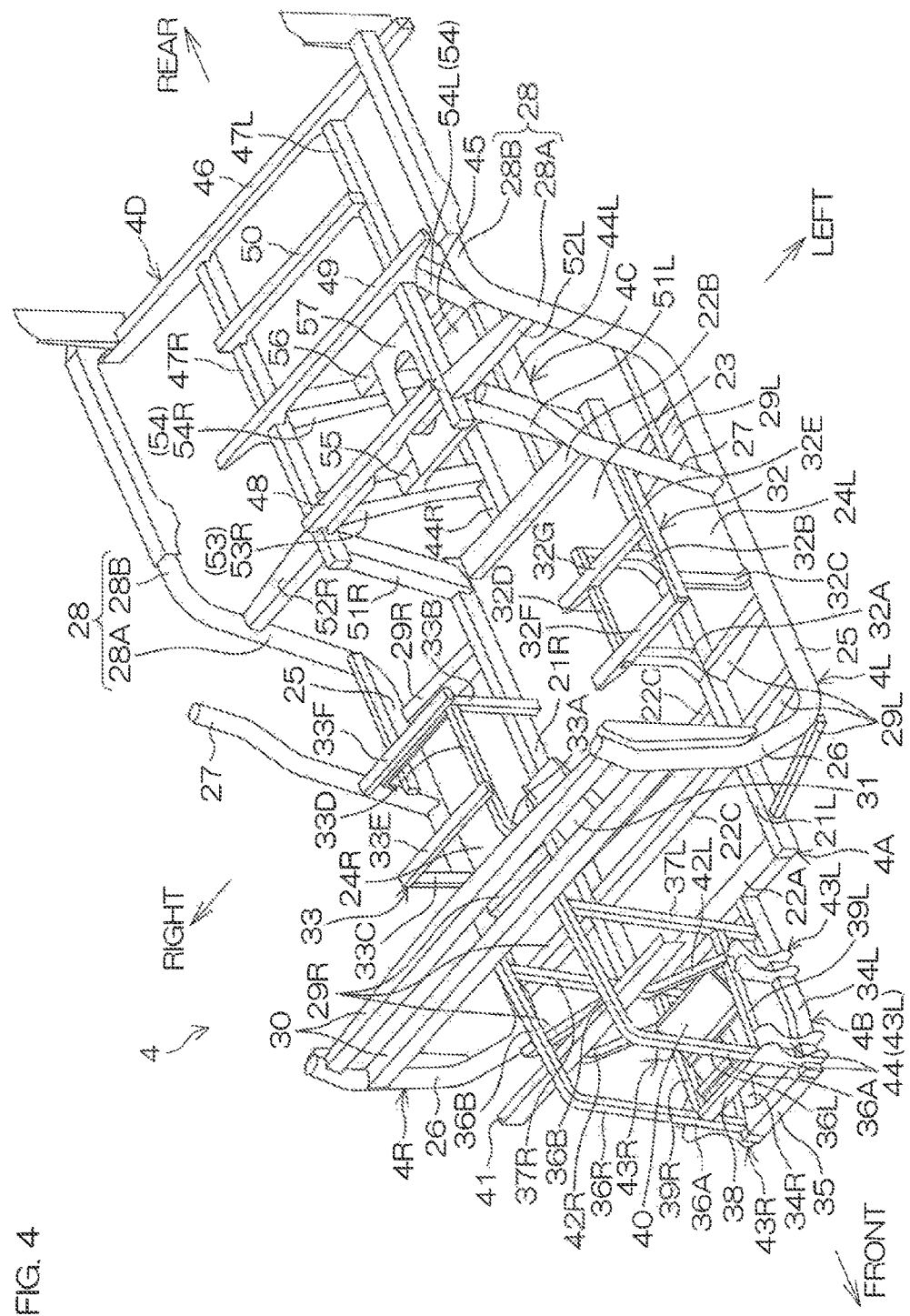
FIG. 4 is a schematic perspective view of the frame included in the vehicle.

FIG. 4 is a schematic perspective view of the frame 4. The above-described intermediate frame 4A, left frame 4L, right frame 4R, front frame 4B, rear frame 4C, and upper frame 4D shall now be described in detail.

The intermediate frame 4A is located between the front frame 4B and the rear frame 4C in regard to the front-rear direction. The intermediate frame 4A includes a left side frame portion 21L, a right side frame portion 21R, a front cross member 22A, a rear cross member 22B, a central plate frame portion 23, a left plate frame portion 24L, and a right plate frame portion 24R. The left side frame portion 21L and the right side frame portion 21R are parallel or substantially parallel to each other and extend in the front-rear direction. The front cross member 22A extends in the right-left direction and links front ends of the right side frame portion 21R and the left side frame portion 21L to each other. The rear cross member 22B extends in the right-left direction and links rear ends of the right side frame portion 21R and the left side frame portion 21L to each other. The frame 4 may include one or more cross members 22C that extend in the right-left direction between the front cross member 22A and the rear cross member 22B and link intermediate portions of the right side frame portion 21R and the left side frame portion 21L to each other.

The central plate frame portion 23 extends, along or substantially along a horizontal plane, between the left side frame portion 21L and the right side frame portion 21R. The left side frame portion 21L and the right side frame portion 21R are linked to each other by the central plate frame portion 23. The left plate frame portion 24L is slightly inclined with respect to a horizontal direction so as to extend leftward and upward from the left side frame portion 21L. The right plate frame portion 24R is slightly inclined with respect to a horizontal direction so as to extend rightward and upward from the right side frame portion 21R.

The left frame 4L extends to an outer side (the left side) of the left side frame portion 21L and is located at a higher position than the central plate frame portion 23. The right frame 4R extends to an outer side (the right side) of the right side frame portion 21R and is located at a higher position than the central plate frame portion 23. The left frame 4L and the right frame 4R are parallel or substantially parallel to each other and face each other in the right-left direction. Each of the left frame 4L and the right frame 4R includes a lateral frame portion 25, a first vertical frame portion 26, a second vertical frame portion 27, and an extension frame portion 28.

The lateral frame portions 25 extend linearly in the front-rear direction. The left side frame portion 21L and the lateral frame portion 25 of the left frame 4L are linked to each other by the left plate frame portion 24L. The right side frame portion 21R and the lateral frame portion 25 of the right frame 4R are linked to each other by the right plate frame portion 24R. The frame 4 may include one or more cross members 29L that extend in the right-left direction and link the left side frame portion 21L and the lateral frame portion 25 of the left frame 4L. The frame 4 may include one or more cross members 29R that extend in the right-left direction and link the right side frame portion 21R and the lateral frame portion 25 of the right frame 4R.

The first vertical frame portions 26 extend upward from front ends of the lateral frame portions 25. Upper end portions of the respective first vertical frame portions 26 of the right frame 4R and the left frame 4L are linked to each other by cylindrical cross members 30 extending in the right-left direction. Each cross member 30 is an example of a cylindrical frame according to a preferred embodiment of the present invention. The frame 4 may include a plurality of cross members 30 and two cross members 30 are juxtaposed in the up-down direction in the present preferred embodiment. A lateral cross-sectional shape of each cross member 30 may be circular or polygonal (for example, rectangular). The frame 4 includes a steering support 31 projecting rearward from a left portion of the lower cross member 30. The steering shaft 11 is coupled to the steering support 31. The second vertical frame portions 27 extend upward from intermediate portions of the lateral frame portions 25. Each extension frame portion 28 includes a vertical portion 28A, extending at an incline upward and rearward from a rear end of a lateral frame portion 25, and a lateral portion 28B, extending horizontally or substantially horizontally rearward from an upper end of the vertical portion 28A. Upper ends of the first vertical frame portions 26, upper ends of the second vertical frame portions 27, and rear ends of the lateral portions 28B of the extension frame portions 28 are coupled to the roll cage 7. The left frame 4L and the right frame 4R may be portions of the roll cage 7.

The intermediate frame 4A includes a left front seat support 32 that supports the left front seat 5AL, and a right front seat support 33 that supports the right front seat 5AR. The left front seat support 32 includes vertical supporting frame portions 32A, 32B, and 32C and horizontal supporting frame portions 32D, 32E, 32F, and 32G. The vertical supporting frame portions 32A and 32B are aligned in the front-rear directions and extend upward from the left side frame portion 21L. The vertical supporting frame portion 32C extends upward from the lateral frame portion 25 of the left frame 4L. The horizontal supporting frame portion 32D extends in the front-rear direction and links upper ends of the vertical supporting frame portions 32A and 32B to each other. The horizontal supporting frame portion 32E extends horizontally or substantially horizontally rearward from an upper end of the vertical supporting frame portion 32C and is connected to the second vertical frame portion 27 of the left frame 4L. The horizontal supporting frame portions 32F and 32G extend in the right-left direction and are aligned in the front-rear direction. Each of the horizontal supporting frame portions 32F and 32G link the horizontal supporting frame portions 32D and 32E to each other. The left front seat 5AL is coupled to the horizontal supporting frame portions 32D, 32F, and 32G of the left front seat support 32.

The right front seat support 33 includes vertical supporting frame portions 33A, 33B, and 33C and horizontal supporting frame portions 33D, 33E, and 33F. The vertical supporting frame portions 33A and 33B are aligned in the front-rear directions and extend upward from the right side frame portion 21R (more specifically, from the central plate frame portion 23 in a vicinity of the right side frame portion 21R). The vertical supporting frame portion 33C extends upward from the lateral frame portion 25 of the right frame 4R. The horizontal supporting frame portion 33D extends in the front-rear direction and link upper ends of the vertical supporting frame portions 33A and 33B to each other. The horizontal supporting frame portion 33E extends rightward from the horizontal supporting frame portion 33D and is connected to an upper end of the vertical supporting frame portion 33C. The horizontal supporting frame portion 33F extends rightward from the upper end of the vertical supporting frame portion 33B and is connected to the second vertical frame portion 27 of the right frame 4R. The right front seat 5AR is coupled to the horizontal supporting frame portions 33D, 33E, and 33F of the right front seat support 33.

The front frame 4B includes a pair of right and left side frame portions 34R and 34L extending forward from the front cross member 22A of the intermediate frame 4A. Front ends of the side frame portions 34R and 34L are linked to each other by a cross member 35 extending in the right-left direction. The front frame 4B includes a pair of supporting frame portions 36L and 36R and a pair of supporting frame portions 37L and 37R.

The supporting frame portion 36L rises upward from a front end portion of the side frame portion 34L and thereafter bends and extends rearward. The supporting frame portion 36R rises upward from a front end portion of the side frame portion 34R and thereafter bends and extends rearward. That is, each of the supporting frame portion 36L and the supporting frame portion 36R includes a vertical portion 36A, extending upward from a front end portion of the side frame portion 34L or 34R, and a lateral portion 36B, extending rearward from an upper end of the vertical portion 36A. A rear end of the lateral portion 36B of each of the supporting frame portion 36L and the supporting frame portion 36R is connected to the lower cross member 30 of the two cross members 30. The supporting frame portion 37L rises upward from a rear end portion of the side frame portion 34L and is connected to a rear end portion of the lateral portion 36B of the supporting frame portion 36L. The supporting frame portion 37R rises upward from a rear end portion of the side frame portion 34R and is connected to a rear end portion of the lateral portion 36B of the supporting frame portion 36R. The intake box 73A is located between the supporting frame portion 36L and the supporting frame portion 36R in the front frame 4B and is coupled to the front frame 4B.

The vertical portions 36A of the supporting frame portions 36R and 36L are linked to each other by a cross member 38 extending in the right-left direction. The vertical portion 36A of the supporting frame portion 36L and the supporting frame portion 37L are linked by a cross member 39L extending in the front-rear direction. The vertical portion 36A of the supporting frame portion 36R and the supporting frame portion 37R are linked by a cross member 39R extending in the front-rear direction. The cross members 39L and 39R are linked by a plate member 40 that is slightly inclined with respect to the horizontal direction so as to extend rearward and upward. The front gearing 87 (see FIG. 3) coupled to the front frame 4B is located below the plate member 40.

The lateral portions 36B of the supporting frame portions 36R and 36L are linked to each other by a cross member 41 extending in the right-left direction. A left end portion of the cross member 41 projects farther leftward than the supporting frame portion 36L and a right end portion of the cross member 41 projects farther rightward than the supporting frame portion 36R. The upper ends of the above-described shock absorbers 67L and 67R are coupled respectively to the left end portion and the right end portion of the cross member 41. The cross members 39L and 41 are linked to each other by a vertical frame portion 42L that rises from a rear end portion of the cross member 39L. The cross members 39R and 41 are linked to each other by a vertical frame portion 42R that rises from a rear end portion of the cross member 39R.

The front frame 4B includes suspension supports 43L and 43R. A pair of front and rear suspension supports 43L are provided. The front suspension support 43L is provided at a lower end portion of the vertical portion 36A of the supporting frame portion 36L. The rear suspension support 43L links the respective rear end portions of the side frame portion 34L and the cross member 39L to each other. Similarly, a pair of front and rear suspension supports 43R are provided. The front suspension support 43R is provided at a lower end portion of the vertical portion 36A of the supporting frame portion 36R. The rear suspension support 43R links the respective rear end portions of the side frame portion 34R and the cross member 39R to each other. Each of the suspension supports 43L and 43R includes, for example, two brackets 44 that are located parallel or substantially parallel to each other.

The respective right ends of the front lower arm 63L and the front upper arm 64L of the front suspension 61L (see FIG. 2) are mounted to the suspension support 43L of the front frame 4B so as to be swingable up and down. The respective left ends of the front lower arm 63R and the front upper arm 64R of the front suspension 61R (see FIG. 2) are mounted to the suspension support 43R of the front frame 4B so as to be swingable up and down.

The rear frame 4C includes a pair of right and left side frame portions 44R and 44L extending rearward from the rear cross member 22B of the intermediate frame 4A, and a plate frame portion 45 extending along or substantially along the horizontal plane and between the side frame portion 44L and the side frame portion 44R. The side frame portion 44L and the side frame portion 44R are linked to each other by the plate frame portion 45. The right end of the rear lower arm 65L of the rear suspension 62L (see FIG. 2) is mounted to the side frame portion 44L of the rear frame 4C so as to be swingable up and down. The left end of the rear lower arm 65R of the rear suspension 62R (see FIG. 2) is mounted to the side frame portion 44R of the rear frame 4C so as to be swingable up and down.

The upper frame 4D includes a cross member 46, a pair of right and left supporting frame portions 47R and 47L, and cross members 48, 49, and 50, extending in the right-left direction, and is located above the rear frame 4C. The cross member 46 extends in the right-left direction and links the rear ends of the respective lateral portions 28B of the left frame 4L and the right frame 4R to each other. The supporting frame portions 47L and 47R are parallel or substantially parallel to each other, are located between the lateral portion 28B of the left frame 4L and the lateral portion 28B of the right frame 4R, and extend forward from the cross member 46. A front end portion of the supporting frame portion 47L is located above a rear end portion of the left side frame portion 21L of the intermediate frame 4A, and a front end portion of the supporting frame portion 47R is located above a rear end portion of the right side frame portion 21R. The cross members 48, 49, and 50 are aligned in that order from the front and link the supporting frame portion 47L and the supporting frame portion 47R. A left end portion of the cross member 49 projects farther leftward than the supporting frame portion 47L, and a right end portion of the cross member 49 projects farther rightward than the supporting frame portion 47R.

The left rear seat 5BL is coupled to the supporting frame portion 47L. The above-described right rear seat 5BR is coupled to the supporting frame portion 47R. The above-described rear deck 60 is coupled to and supported by the supporting frame portion 47L, the supporting frame portion 47R, cross member 49, cross member 50, etc., of the upper frame 4D. The upper ends of the above-described shock absorbers 68L and 68R are respectively coupled to the left end portion and the right end portion of the cross member 49. The above-described muffler 74A is located below the supporting frame portions 47L and 47R at the upper frame 4D.

The frame 4 may include a cross member 51L extending in the up-down direction and linking the front end portion of the supporting frame portion 47L and the rear end portion of the left side frame portion 21L. The frame 4 may include a cross member 51R extending in the up-down direction and linking the front end portion of the supporting frame portion 47R and the rear end portion of the right side frame portion 21R. The frame 4 may include a cross member 52L extending in the right-left direction and linking the front end portion of the supporting frame portion 47L and the extension frame portion 28 of the left frame 4L. The frame 4 may include a cross member 52R extending in the right-left direction and linking the front end portion of the supporting frame portion 47R and the extension frame portion 28 of the right frame 4R.

The frame 4 includes a pair of right and left front vertical frames 53 respectively extending upward from the side frame portions 44R and 44L of the rear frame 4C, and a pair of right and left rear vertical frames 54 respectively extending upward from the side frame portions 44R and 44L. The pair of front vertical frames 53 and the pair of rear vertical frames 54 are an example of a pair of vertical frames according to a preferred embodiment of the present invention. Although not visible in FIG. 4 due to being hidden behind the cross member 51L, an upper end of the left front vertical frame 53L of the pair of front vertical frames 53 is linked to the supporting frame portion 47L. An upper end of the right front vertical frame 53R is linked to the supporting frame portion 47R. The pair of rear vertical frames 54 are located farther rearward than the pair of front vertical frames 53. The upper end of the left rear vertical frame 54L of the pair of rear vertical frames 54 is linked to the supporting frame portion 47L and the upper end of the right rear vertical frame 54R is linked to the supporting frame portion 47R.

The right end of the rear upper arm 66L of the rear suspension 62L (see FIG. 2) is mounted to the front vertical frame 53L and the rear vertical frame 54L extending upward from the side frame portion 44L, so as to be swingable up and down. The left end of the rear upper arm 66R of the rear suspension 62R (see FIG. 2) is mounted to the front vertical frame 53R and the rear vertical frame 54R extending upward from the side frame portion 44R, so as to be swingable up and down.

A cross member 55 extending in the right-left direction links intermediate portions of the pair of front vertical frames 53 to each other. A cross member 56 extending in the right-left direction links intermediate portions of the pair of rear vertical frames 54 to each other. A plate member 57 located along or substantially along the horizontal plane links the cross member 55 and the cross member 56. The rear gearing 88 (see FIG. 3) coupled to the rear frame 4C is located below the plate member 57.

Figure 5:
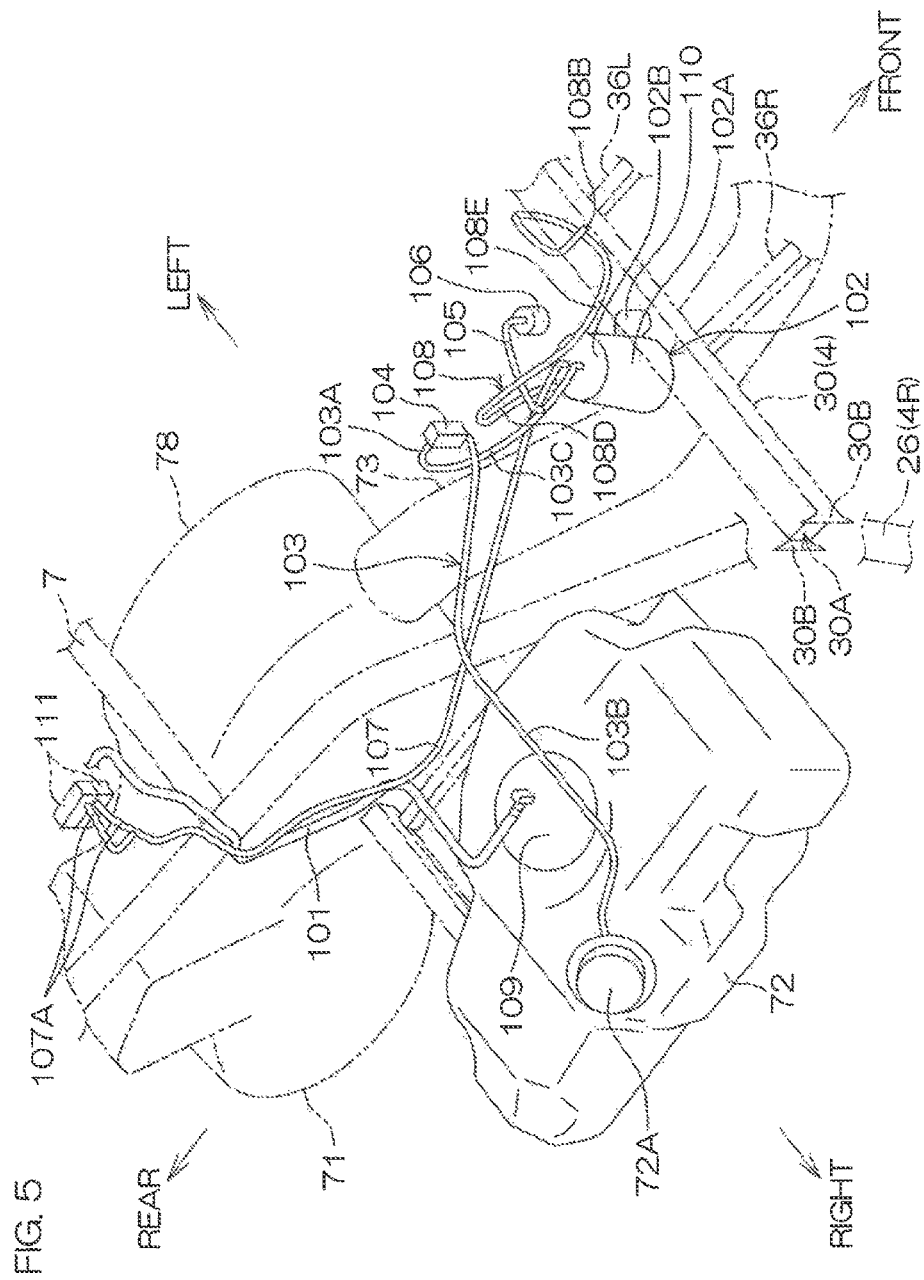
FIG. 5 is a schematic partially enlarged perspective view of a vicinity of a fuel tank included in the vehicle.

FIG. 5 is a schematic partially enlarged perspective view of a vicinity of the fuel tank 72. The various pipes described below are preferably hoses that are flexible and made of, for example, rubber or the like, but are not restricted to being made of rubber and may be made of metal instead. In relation to the fuel tank 72, the vehicle 1 includes a fuel pipe 101, a canister 102, a gas pipe 103, a shutoff valve 104, a vent pipe 105, a vent valve 106, a purge pipe 107, and a breather pipe 108.

Figure 6:
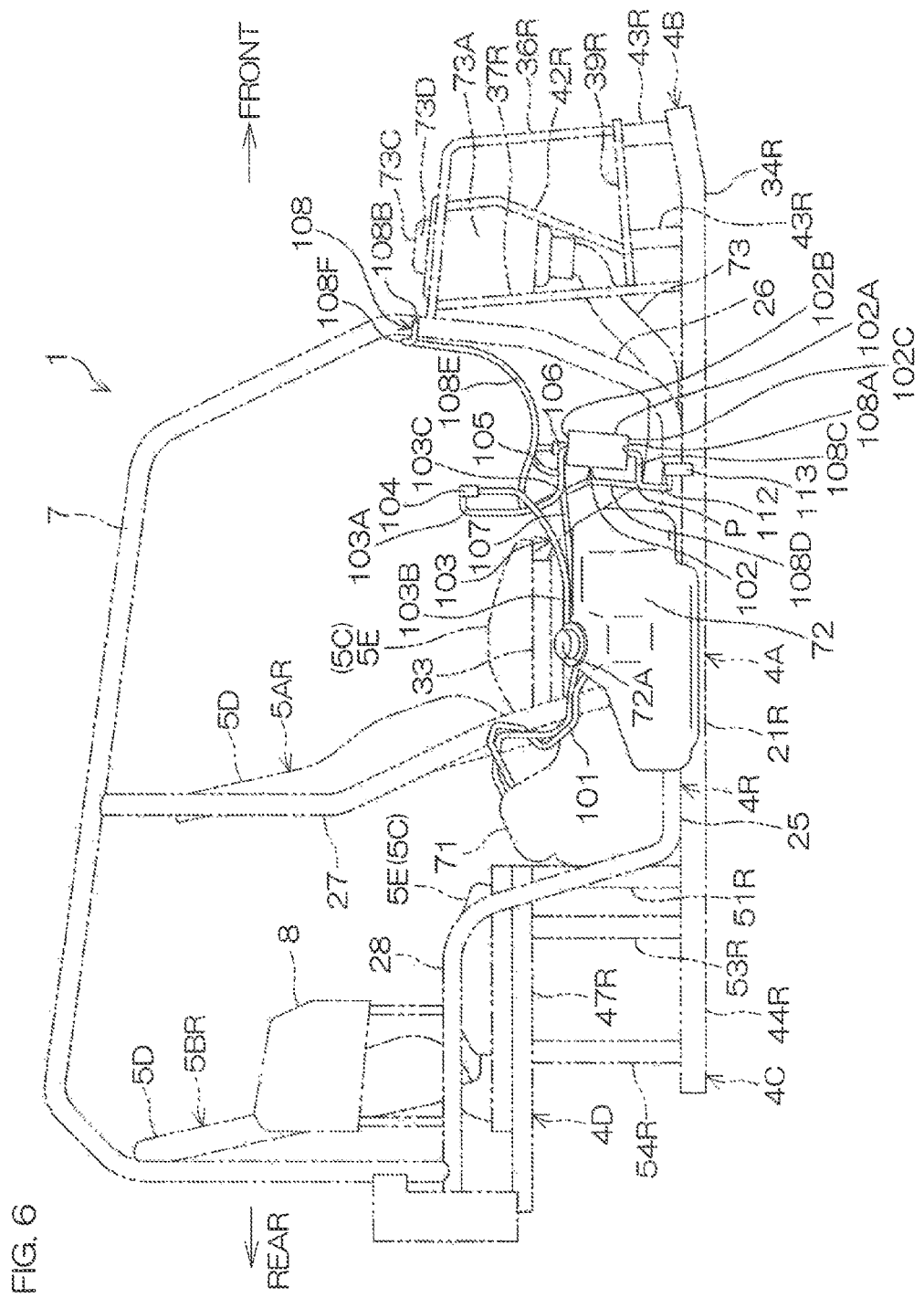
FIG. 6 is a schematic side view of the vehicle.

FIG. 6 is a schematic left side view of the vehicle 1 with the fuel tank 72 and the canister 102, etc., being indicated by solid lines and the frame 4, etc., being indicated by alternate long and two short dashed lines. Referring to FIG. 5 and FIG. 6, one end of the fuel pipe 101 is connected to the fuel tank 72 via a fuel pump 109 provided on an upper surface of the fuel tank 72. The fuel pipe 101 extends rearward and upward from the fuel pump 109. An intermediate portion of the fuel pipe 101 may be curved. Another end of the fuel pipe 101 is connected to an injector (not shown) provided at the throttle body of the engine 71. The fuel inside the fuel tank 72 is fed into the fuel pipe 101 by the fuel pump 109. The fuel that flows inside the fuel pipe 101 is injected by the injector into the intake ports (not shown) of the respective cylinders or into the respective cylinders of the engine 71. The fuel injected into the intake ports and air arriving at the intake ports upon flowing through the intake passage 73 are mixed to become intake gas that is ignited and combusted inside the respective cylinders of the engine 71. The rotational power of the engine 71 is thus generated.

The canister 102 includes activated carbon or other adsorbent (not shown) and a cylindrical waterproof case housing the adsorbent to seal an interior of the canister 102. The canister 102 in the present preferred embodiment preferably has a circular cylindrical shape or substantially circular cylindrical shape extending along the up-down direction. An outer surface of the canister 102 includes a circular cylindrical outer peripheral surface 102A, a circular upper surface 102B connected to an upper end edge of the outer peripheral surface 102A, and a circular lower surface 102C connected to a lower end edge of the outer peripheral surface 102A. An upper end portion of the outer peripheral surface 102A and the upper surface 102B define an upper portion of the outer surface of the canister 102. A lower end portion of the outer peripheral surface 102A and the lower surface 102C define a lower portion of the outer surface of the canister 102. The canister 102 in the present preferred embodiment is located farther to the left and forward than the fuel tank 72 and is fixed to the intermediate frame 4A via a bracket 110. The canister 102 is located in proximity to the fuel tank 72 so as to be at the same or substantially the same height position as the fuel tank 72. The canister 102 is preferably located at an inconspicuous position near the feet of an occupant seated on the seat 5AR.

One end of the gas pipe 103 is connected to a periphery of the fuel cap 72A at the upper surface of the fuel tank 72. The gas pipe 103 extends leftward and forward toward the canister 102. A U-turn portion 103A extending upward and then bent downward, is provided at an intermediate portion of the gas pipe 103. Another end of the gas pipe 103 is connected to the upper portion of the outer surface of the canister 102, specifically the upper surface 102B. An upstream portion 103B of the gas pipe 103 from the one end thereof to the U-turn portion 103A, extends upward toward the U-turn portion 103A while curving at an intermediate portion. A downstream portion 103C from the U-turn portion 103A to the other end, extends downward toward the upper surface 102B of the canister 102 while curving at an intermediate portion. With the gas pipe 103 of the present arrangement, the U-turn portion 103A prevents the fuel inside the fuel tank 72 from flowing in the liquid state into the canister 102 through the gas pipe 103.

The canister 102 is connected to the fuel tank 72 via the gas pipe 103. Evaporated gas generated by evaporation of the fuel inside the fuel tank 72 flows into the canister 102 through the gas pipe 103 and is adsorbed by the adsorbent (not shown) inside the canister 102.

The shutoff valve 104 is connected to the U-turn portion 103A of the gas pipe 103. The shutoff valve 104 includes a valve element (not shown). During travelling on a rough road, the vehicle 1 may tilt with respect to a vertical direction. When a tilt angle of the vehicle 1 with respect to the vertical direction is less than a predetermined angle (for example, about 45 degrees), the valve element of the shutoff valve 104 is at an open position and does not shut off the gas pipe 103. However, when the vehicle 1 tilts at the predetermined angle or more with respect to the vertical direction, the valve element of the shutoff valve 104 becomes displaced from the open position to a closed position and shuts off the gas pipe 103. The fuel inside the fuel tank 72 is thus prevented from flowing in the liquid state into the canister 102 through the gas pipe 103. The shutoff valve 104 is located higher than each of the fuel tank 72, the canister 102, and the seat surfaces 5E of the front seats 5A.

One end of the vent pipe 105 is connected to the downstream portion 103C of the gas pipe 103. Another end of the vent pipe 105 is connected to the vent valve 106. When an interior of the fuel tank 72 reaches a negative pressure by cooling of the fuel tank 72, etc., the vent valve 106 opens. The interior of the fuel tank 72 is thus opened to the atmosphere via the gas pipe 103 and the vent pipe 105 and the negative pressure state inside the fuel tank 72 is thus eliminated. When the negative pressure state inside the fuel tank 72 is eliminated, the vent valve 106 closes. When the interior of the fuel tank 72 reaches a negative pressure in a state in which the downstream portion 103C is clogged by a foreign object, there is a possibility of the fuel tank 72 contracting and deforming. However, the negative pressure state inside the fuel tank 72 is eliminated by the vent valve 106 opening, thus preventing deformation of the fuel tank 72.

One end of the purge pipe 107 is connected to the upper portion of the outer surface of the canister 102, specifically a portion of the upper surface 102B spaced from the gas pipe 103. The purge pipe 107 extends rearward toward the throttle body (not shown) of the engine 71. Another end of the purge pipe 107 branches into two branch passages 107A corresponding to the number of cylinders of the engine 71. A purge cut-off valve 111 connected to the throttle body (not shown) of the engine 71 is connected to each branch passage 107A. Each purge cut-off valve 111 is a solenoid valve, for example, that is controlled to open and close. In a state in which the engine 71 is actuated, an interior of the throttle body is brought to negative pressure and therefore when the purge cut-off valve 111 opens, an interior of the purge pipe 107 is also brought to negative pressure. The evaporated gas inside the canister 102 is then drawn into the throttle body through the purge pipe 107 and supplied to the engine 71 as intake gas. Due to the evaporated gas being drawn off from inside the canister 102, the adsorbent (not shown) inside the canister 102 is refreshed.

The breather pipe 108 includes an inlet 108A positioned at one end of the breather pipe 108, and an outlet 108B positioned at another end of the breather pipe 108. The inlet 108A is connected to a lower portion of the canister 102, specifically the lower surface 102C of the canister 102. The breather pipe 108 includes an upstream portion 108C, a midstream portion 108D, and a downstream portion 108E. The upstream portion 108C extends downward from the inlet 108A and thereafter bends and extends rearward. From a rear end of the upstream portion 108C, the midstream portion 108D extends upward past the rear of the canister 102. From an upper end of the midstream portion 108D, the downstream portion 108E connects to the outlet 108B upon extending forward and upward past a position higher than the canister 102. That is, the breather pipe 108 extends downward and thereafter bends and extends rearward at the upstream portion 108C, bends at a boundary of the upstream portion 108C and the midstream portion 108D and then extends upward, and bends at a boundary of the midstream portion 108D and the downstream portion 108E and then extends forward and upward. Respective intermediate portions of the midstream portion 108D and the downstream portion 108E may be curved so as to provide slack.

An upper end portion of the downstream portion 108E in the present preferred embodiment bends and extends to the lower right and thereafter bends forward and the outlet 108B is located at a front end of the upper end portion. That is, the outlet 108B is located in a vicinity of an upper end 108F (see FIG. 6) of the breather pipe 108, that is, at a position slightly lower than the highest position of the upper end portion of the downstream portion 108E. Obviously, the outlet 108B may be located at the upper end 108F of the breather pipe 108.

An insertion hole (not shown) through which the upper end portion of the downstream portion 108E is inserted is provided in a rear surface of the cross member 30 of the frame 4 and the outlet 108B is located inside the cross member 30. An opening 30A and a pair of front and rear flange portions 30B are provided at a right end portion of the cross member 30. The opening 30A is in communication with an interior of the cross member 30. The pair of flange portions 30B project farther rightward than the opening 30A and are coupled to the first vertical frame portion 26 of the right frame 4R. A gap is thus secured between the opening 30A and the first vertical frame portion 26 and the opening 30A is opened to the atmosphere via this gap. The outlet 108B inside the cross member 30 is thus also opened to the atmosphere. The opening 30A and the flange portion 30B may not be located at the right end portion but at a left end portion of the cross member 30 instead, or may be located at both the right end portion and the left end portion.

The outlet 108B of the breather pipe 108 is located higher than the seat surfaces 5E of the front seats 5A. The outlet 108B is located at the same or substantially the same height position as the air inlet 73D of the intake box 73A or a position higher than this height position. Air, such as the evaporated gas purified by passage through the adsorbent inside the canister 102, etc., flows through the breather pipe 108 and flows out from the outlet 108B.

The vehicle 1 further includes a drainpipe 112 branching from the breather pipe 108, and a check valve 113. A branching position P of the breather pipe 108 and the drainpipe 112 is at the rear end of the upstream portion 108C. The midstream portion 108D of the breather pipe 108 extends upward from the branching position P and the drainpipe 112 extends downward from the branching position P. A drain hole 112A (see FIG. 7 described below) is provided at a lower end of the drainpipe 112. The drain hole 112A is located lower than the outlet 108B of the breather pipe 108. The lower surface 102C of the canister 102 is located lower than the outlet 108B and higher than the drain hole 112A.

Figure 7:
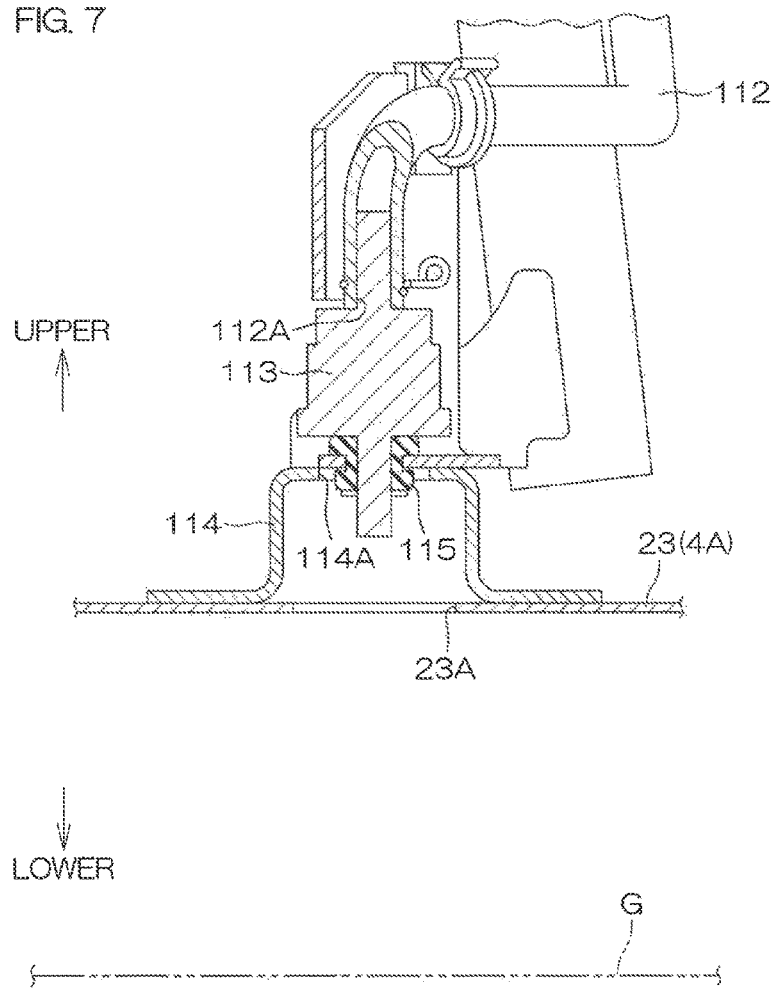
FIG. 7 is a schematic view of viewing a vertical section of a vicinity of a check valve which is a component related to the canister, from a side.

FIG. 7 is a schematic view of a vertical section of a vicinity of the check valve 113 from the left side. The drain hole 112A is located above the central plate frame portion 23 of the intermediate frame 4A. A penetrating hole 23A penetrating in the up-down direction through the central plate frame portion 23 is provided directly below the drain hole 112A. The drain hole 112A is thus located to face the ground G via the penetrating hole 23A.

An upper end portion of the check valve 113 is inserted through the drain hole 112A. The check valve 113 is fixed to the central plate frame portion 23 via a bracket 114. The bracket 114 is made, for example, by bending a metal plate material into a projecting shape. A penetrating hole 114A, penetrating in the up-down direction through the bracket 114 is located directly below the drain hole 112A and directly above the penetrating hole 23A of the central plate frame portion 23. A lower end portion of the check valve 113 is inserted into the penetrating hole 114A and linked to the bracket 114 via a grommet 115, for example. The check valve 113 is preferably a one-way valve that allows a liquid inside the drainpipe 112 to flow down from the drain hole 112A but prevents reverse flow from the drain hole 112A into the drainpipe 112.

Figure 8:
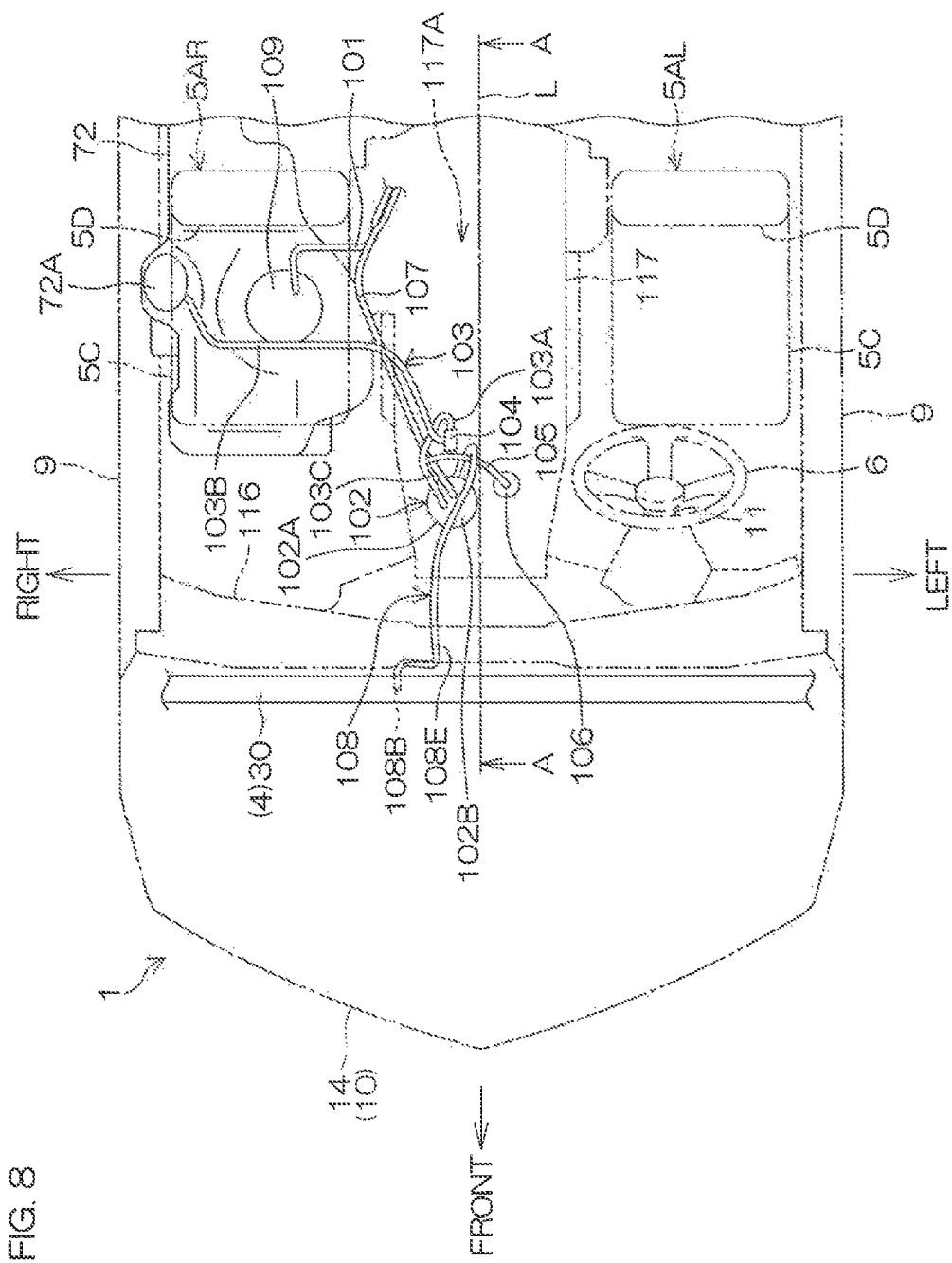
FIG. 8 is a schematic plan view of a front portion of the vehicle.
Figure 9:
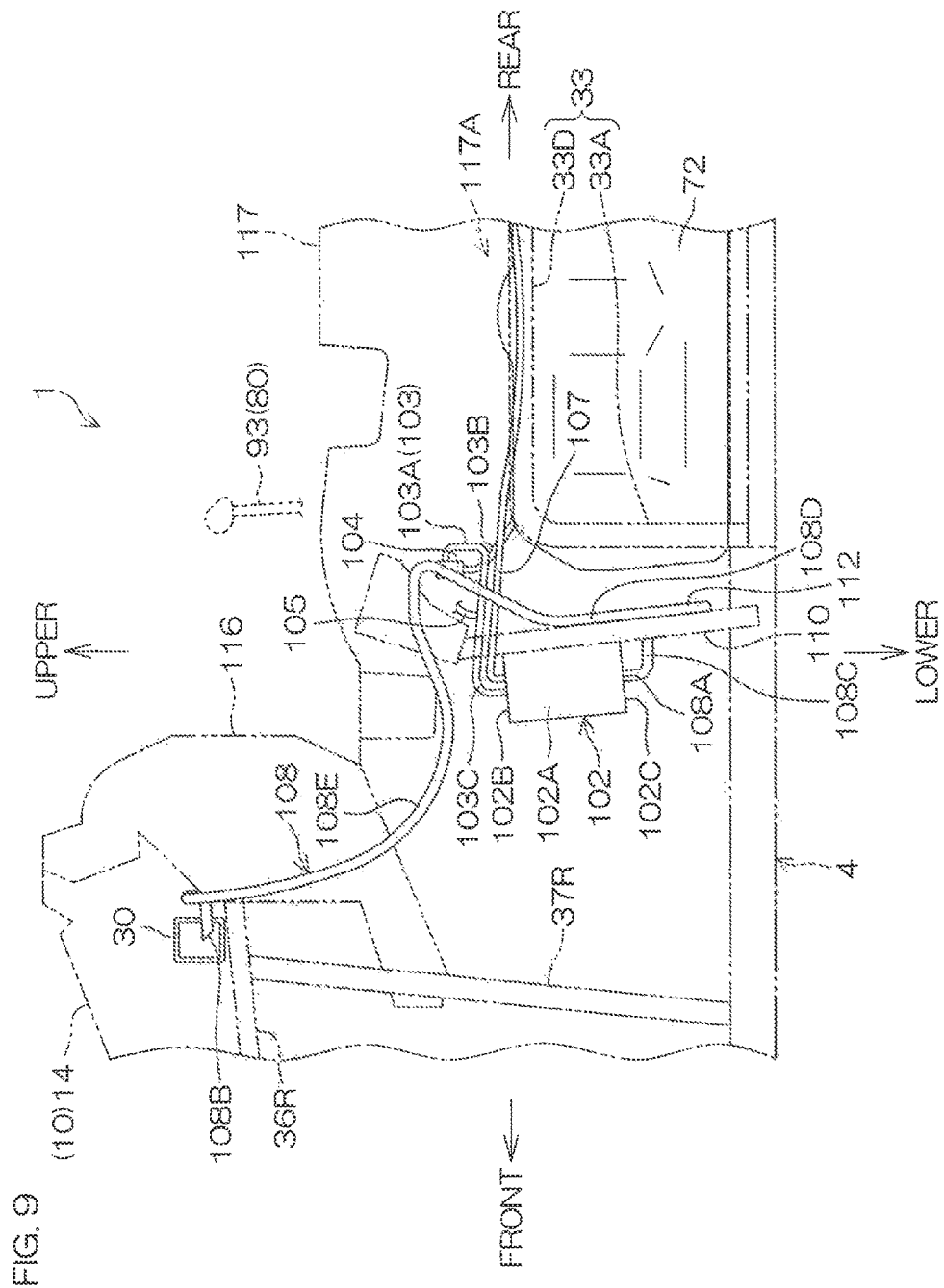
FIG. 9 is a schematic sectional view taken along line A-A of FIG. 8.

FIG. 8 is a schematic plan view of a front portion of the vehicle 1 with the fuel tank 72 and the canister 102, etc., being indicated by solid lines and the body panel 10, etc., being indicated by alternate long and two short dashed lines. FIG. 9 is a schematic sectional view taken along line A-A of FIG. 8.

The vehicle 1 further includes a dash panel 116 and a center console 117. The dash panel 116 and the center console 117 are, for example, made of resin and are mounted to the frame 4. Each of the dash panel 116 and the center console 117 may define a portion of the body panel 10. The dash panel 116 is elongated in the right-left direction and extends downward from a rear end of the front panel 14 of the body panel 10. The steering shaft 11 (see FIG. 1) projects rearward from a left portion of the dash panel 116. Instruments (not shown) such as a speedometer, etc., may be provided on the dash panel 116.

The dash panel 116 is located farther forward than the backrests 5D of the right and left front seats 5A and covers at least a portion of the cross member 30 from the rear. The outlet 108B of the breather pipe 108 is located inside the cross member 30 and therefore the dash panel 116 also covers a portion of the breather pipe 108 from the rear. Specifically, the downstream portion 108E of the breather pipe 108 is covered by the dash panel 116.

The center console 117 extends rearward from a central portion of the dash panel 116 in the right-left direction and is located between the two front seats 5A in plan view. The operation lever 93 projects upward from the center console 117. The center console 117 bulges upward. The center console 117 thus defines a tunnel space 117A extending to the front and rear below the center console 117. The canister 102 and a portion of the breather pipe 108 are located in the tunnel space 117A. That is, the center console 117 covers the canister 102 and the portion of the breather pipe 108 from above. Specifically, all portions of the breather pipe 108 positioned farther rearward than the dash panel 116 are covered by the center console 117. In addition to the canister 102 and the breather pipe 108, the shutoff valve 104, the vent pipe 105, and the vent valve 106 and at least a portion of each of the fuel pipe 101, the gas pipe 103, and the purge pipe 107 are hidden below the center console 117.

As described above, with the structural arrangement of the present preferred embodiment, the outlet 108B of the breather pipe 108 connected to the canister 102 is open to the atmosphere and located at the position higher than the seat surfaces 5E of the seats 5. It may be assumed that when the vehicle 1 crosses a river or travels through a puddle, water outside the vehicle would enter into the vehicle due to immersion of the vehicle 1 in water. Because the outlet 108B of the breather pipe 108 is at the position higher than the seat surfaces 5E of the seat 5 as described above, water that has entered into the vehicle is less likely to reach the outlet 108B in comparison to a case in which the outlet 108B is located lower than the seat surfaces 5E of the seat 5. The outlet 108B is thus less likely to become immersed in water. Entry of water into the canister 102 from the outlet 108B and through the breather pipe 108 is thus significantly reduced or prevented. Performance degradation of the canister 102 due to wetting of the adsorbent (not shown) inside the canister 102, etc., due to entry of water is also significantly reduced or prevented.

There may be a case in which the vehicle 1 travels while jumping or hopping in a state in which the engine 71 rotates at high speed and the interior of the fuel tank 72 is at a high temperature. According to research by the present inventor, in such a traveling state, there may be a case in which the evaporated gas becomes cooled and liquefied inside the gas pipe 103 to become liquid fuel that flows into the canister 102 and thereafter flows inside the breather pipe 108. Thus, with the present preferred embodiment, the drainpipe 112 is branched from the breather pipe 108. The liquid fuel inside the breather pipe 108 is thus guided into the drainpipe 112 from the branching position P of the breather pipe 108 and the drainpipe 112. The liquid fuel guided into the drainpipe 112 is drawn off out of the vehicle toward the ground G from the drain hole 112A located at a lower position than the outlet 108B of the breather pipe 108.

According to a preferred embodiment of the present invention, the breather pipe 108 extends upward from the branching position P with respect to the drainpipe 112, and the outlet 108B of the breather pipe 108 is adjacent or close to the upper end 108F of the breather pipe 108. The outlet 108B is thus reliably located at the position higher than the seat surfaces 5E of the seats 5. A possibility of water entering into the canister 102 from the outlet 108B and through the breather pipe 108 when the vehicle 1 becomes immersed in water is thus reduced in comparison to the case in which the outlet 108B is lower than the seat surfaces 5E.

According to a preferred embodiment of the present invention, the outlet 108B of the breather pipe 108 is located at the same or substantially the same height position as the air inlet 73D of the intake passage 73 or a position higher than this height position. The air inlet 73D is generally located higher than a water surface assumed when the vehicle 1 becomes immersed in water and therefore the outlet 108B that is located at the height position equal to or higher than the air inlet 73D is also reliably located higher than the water surface. The possibility of water entering into the canister 102 from the outlet 108B and through the breather pipe 108 when the vehicle 1 becomes immersed in water is thus reduced further.

Also, according to a preferred embodiment of the present invention, the check valve 113 is able to prevent water outside the vehicle 1 from flowing from the drain hole 112A into the drainpipe 112 and entering into the canister 102 through the breather pipe 108.

Further, according to a preferred embodiment of the present invention, the lower surface 102C of the canister 102 is located at the position lower than the outlet 108B of the breather pipe 108 and higher than the drain hole 112A. The inlet 108A of the breather pipe 108 is connected to the lower surface 102C, the drainpipe 112 extends downward from the branching position P with respect to the breather pipe 108, and the drain hole 112A is located at the lower end of the drainpipe 112 and faces the ground G. In accordance with this preferred embodiment, when the evaporated gas liquefies to become liquid fuel that flows into the canister 102, the liquid fuel inside the canister 102 flows down inside the breather pipe 108 from the lower surface 102C. The liquid fuel that flows down inside the breather pipe 108 flows down inside the drainpipe 112 and is drawn off from the drainpipe 112 to the ground G outside the vehicle 1.

According to a preferred embodiment of the present invention, the shutoff valve 104 is able to prevent the liquid fuel inside the fuel tank 72 from flowing into the canister 102 through the gas pipe 103 when the vehicle 1 tilts by the predetermined angle or more with respect to the vertical direction.

According to a preferred embodiment of the present invention, the shutoff valve 104 is located higher than the fuel tank 72, the canister 102, and the seat surfaces 5E of the seats 5. The shutoff valve 104 is thus actuated reliably to shut off the gas pipe 103 before the liquid fuel inside the fuel tank 72 reaches the shutoff valve 104 when the vehicle 1 tilts by the predetermined angle or more with respect to the vertical direction. Flow of the liquid fuel into the canister 102 is thus prevented.

According to a preferred embodiment of the present invention, during operation of the engine 71, air inside the purge pipe 107, which is connected to the canister 102, is drawn in by the engine 71. Ambient air is thus drawn in from the breather pipe 108 and reaches the canister 102 to release the fuel adsorbed by the canister 102. The evaporated fuel thus generated is supplied to the engine 71 via the purge pipe 107 and purged by the engine 71. The fuel adsorbed inside the canister 102 is thus able to be used for operation of the engine 71.

According to a preferred embodiment of the present invention, at least a portion of the fuel tank 72 is located directly below the seats 5 so as to overlap with the seats 5 in plan view, thus providing a compact vehicle 1 having small dimensions in the front-rear direction and the right-left direction.

According to a preferred embodiment of the present invention, due to the engine 71 being located lower than the seat surfaces 5E of the seats 5, a wide riding space inside the vehicle is secured. Therefore, four occupants of a large size are able to ride in the vehicle 1. Locating the engine 71, which is a heavy object, at the width direction center of the vehicle 1 improves the motion performance of the vehicle 1. When the engine 71 is thus located lower than the seat surfaces 5E of the seats 5, the fuel tank 72 which is connected to the engine 71 is located in proximity of the engine 71, and the canister 102 which is connected to the fuel tank 72 is located in proximity to the fuel tank 72. Therefore, the canister 102 is, by necessity, located at a low position (a position readily immersed in water or mud) as are the engine 71 and the fuel tank 72. However, by locating the outlet 108B of the breather pipe 108 as described above significantly reduces or prevents entry of water or mud into the canister 102 from the outlet 108B and through the breather pipe 108.

According to a preferred embodiment of the present invention, the outlet 108B of the breather pipe 108 is located inside the cross member 30. Thus, evaporated gas that is not adsorbed inside the canister 102 and passes through the breather pipe 108 to arrive at the outlet 108B flows out from the outlet 108B into the cross member 30 and is drawn off through the cross member 30 and out of the vehicle 1 from the opening 30A of the cross member 30.

According to a preferred embodiment of the present invention, a portion of the breather pipe 108 is hidden from view by the dash panel 116, thus preventing touching of the breather pipe 108 by an occupant seated on a seat 5. Therefore, the position of the breather pipe 108, especially the position of the outlet 108B thereof is not changed inadvertently and the outlet 108B is thus reliably located higher than the seat surfaces 5E of the seats 5.

Also, at least a portion of the cross member 30 is hidden from view by the dash panel 116, thus further preventing touching of the outlet 108B of the breather pipe 108 inside the cross member 30 by an occupant seated on a seat 5. Thus, the coupling of the breather pipe 108 and the cross member 30 does not become disconnected inadvertently and the outlet 108B of the breather pipe 108 is thus reliably located higher than the seat surfaces 5E of the seats 5.

Further, a portion of the breather pipe 108 is hidden from view by the center console 117, thus still further preventing touching of the breather pipe 108 by an occupant seated on a seat 5. The center console 117 covers the canister 102 from above and therefore the canister 102 is also hidden from view by the center console 117. Touching of the canister 102 by an occupant seated on a seat 5 is prevented.

According to a preferred embodiment of the present invention, the engine 71 is aligned with the fuel tank 72 in the right-left direction which is the width direction of the vehicle 1, therefore providing a compact vehicle 1 having a small dimension in the front-rear direction.

Figure 10:
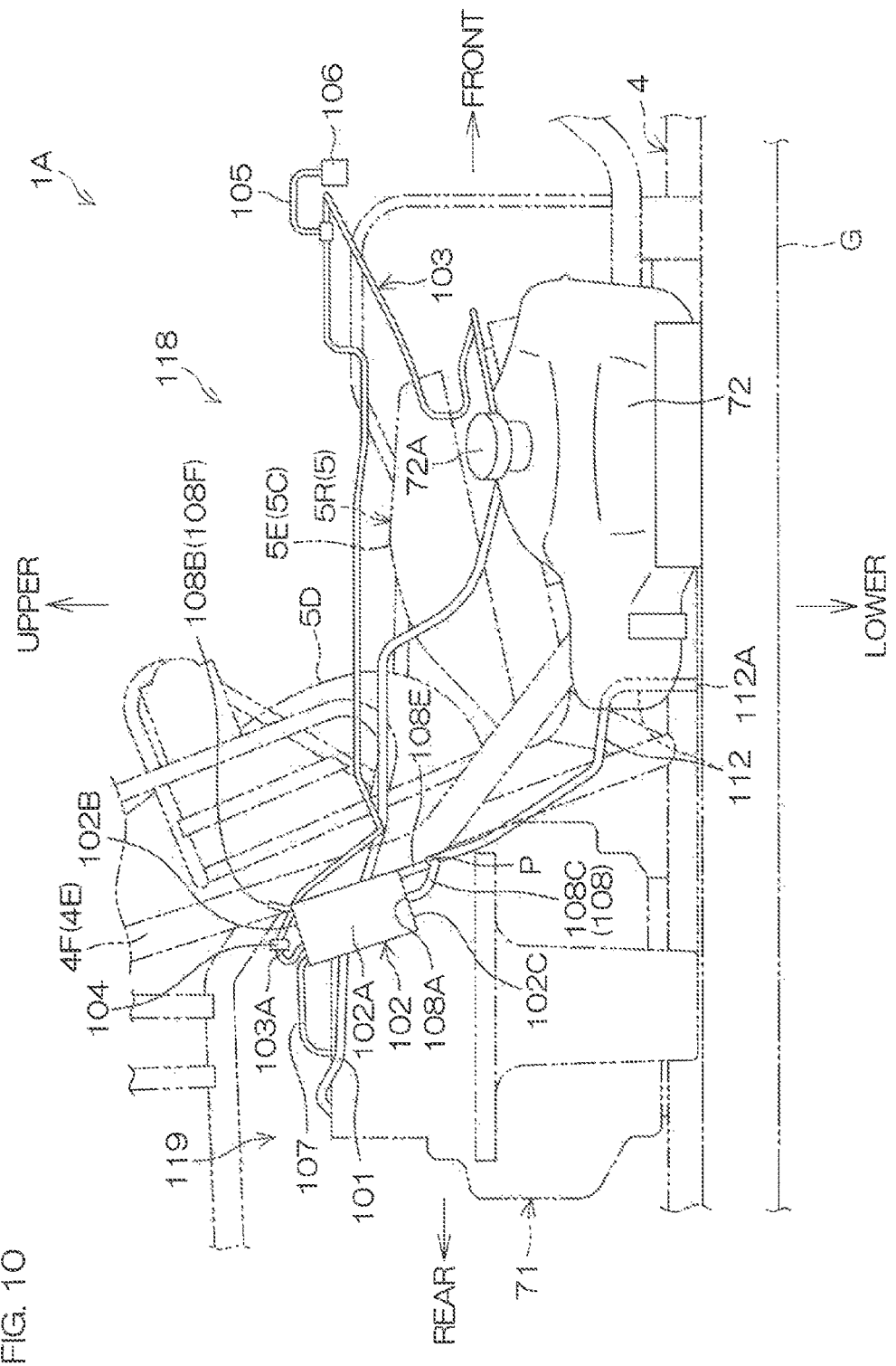
FIG. 10 is a schematic partially enlarged side view of a vicinity of the fuel tank in a vehicle according to another preferred embodiment of the present invention.

FIG. 10 is a schematic partially enlarged side view of a vicinity of a fuel tank 72 in a vehicle 1A according to another preferred embodiment of the present invention. FIG. 11 is a schematic partially enlarged plan view of the vicinity of the fuel tank 72 in the vehicle 1A. In the description that follows, elements that are functionally the same as elements in relation to the preferred embodiments described above are provided with the same numbers and detailed description of such elements will be omitted.

The vehicle 1A is a two seated vehicle for which, for example, sport driving is assumed. Therefore, the seats 5 include two seats 5 aligned in the right-left direction. A frame 4 of the vehicle 1A includes a partition frame 4E partitioning an internal space 118 in which the seats 5 are located, and an external space 119 farther rearward than the internal space 118. The partition frame 4E includes a cylindrical frame 4F which, for example, extends upward while inclining rearward along backrests 5D of the seats 5. In the internal space 118, the fuel tank 72 is located lower than a seat surface 5E of a right seat 5R of the two seats 5 and at least a portion of the fuel tank 72 overlaps with the seat 5R in plan view. An engine 71 is located in the external space 119 farther rearward than the fuel tank 72 so as to overlap with a centerline L of the vehicle 1A in plan view. In accordance with this structural arrangement, a component other than the engine 71 is able to be juxtaposed with the fuel tank 72 in the right-left direction and a component other than the fuel tank 72 is able to be juxtaposed with the engine 71 in the right-left direction.

A fuel pipe 101 connected to the fuel tank 72 extends leftward and upward and is connected to the engine 71.

A canister 102 is located farther rearward than the backrest 5D of the seat 5R and is fixed to the partition frame 4E. In accordance with this structural arrangement, the canister 102 is located at a position that is unlikely to be reached by a hand of an occupant seated on a seat 5, thus preventing touching of the canister 102 by the occupant seated on the seat 5. A central axis (not shown) of the cylindrical canister 102 is inclined along the cylindrical frame 4F. An upper surface 102B of the canister 102 is located higher than the seat surfaces 5E of the seats 5. A lower surface 102C of the canister 102 is located higher than the fuel tank 72. The lower surface 102C may be located higher than the seat surfaces 5E of the seats 5.

A gas pipe 103 extends farther forward than the seat 5R and then bends and extends to the left, and after bending several times, extends rearward at a location farther leftward than the seat 5R, extends to the right behind the seat 5R, and is connected to the upper surface 102B of the canister 102. The U-turn portion 103A is provided at an end portion of the gas pipe 103 close to the canister 102. A shutoff valve 104 is connected to the U-turn portion 103A. The shutoff valve 104 is located higher than each of the fuel tank 72, the canister 102, and the seat surfaces 5E of the seats 5.

A vent pipe 105 connected to a vent valve 106 is connected to a portion of the gas pipe 103 positioned farther leftward and forward than the seat 5R. One end of a purge pipe 107 is connected to a portion of the upper surface 102B of the canister 102 spaced from the gas pipe 103. The purge pipe 107 extends rearward toward a throttle body (not shown) of the engine 71 and is connected to the engine 71.

In FIG. 11, illustration of a breather pipe 108 and a drainpipe 112 is omitted.

FIG. 12 is a schematic partially enlarged perspective view of a vicinity of the canister 102 in the vehicle 1A. An inlet 108A of the breather pipe 108 is connected to the lower surface 102C of the canister 102. The breather pipe 108 includes an upstream portion 108C and a downstream portion 108E. The upstream portion 108C extends downward from the inlet 108A and thereafter bends and extends leftward. From a left end of the upstream portion 108C, the downstream portion 108E extends upward past the left side of the canister 102. An outlet 108B of the breather pipe 108 is provided at an upper end of the downstream portion 108E, that is, at an upper end 108F of the breather pipe 108.

An insertion hole 4G through which an upper end portion of the downstream portion 108E is inserted, is provided in the cylindrical frame 4F of the partition frame 4E, and the outlet 108B is located inside the cylindrical frame 4F. An opening 4H open to the atmosphere, is provided, for example, at a lower end portion of the cylindrical frame 4F. The outlet 108B inside the cylindrical frame 4F is thus open to the atmosphere via the opening 4H. The outlet 108B is located higher than the seat surfaces 5E of the seats 5 (see FIG. 10). As in the vehicle 1, the outlet 108B may be located at the same or substantially the same height position as an air inlet 73D of an intake box 73A or a position higher than this height position.

A branching position P of the breather pipe 108 and the drainpipe 112 defines a left end of the upstream portion 108C. The downstream portion 108E of the breather pipe 108 extends upward from the branching position P, and the drainpipe 112 extends downward from the branching position P. A lower end of the drainpipe 112 is located farther leftward than the fuel tank 72 (see FIG. 10). A drain hole 112A is provided at the lower end of the drainpipe 112 and, as in the vehicle 1, is located so as to face the ground G (see FIG. 10). The drain hole 112A is located lower than the outlet 108B of the breather pipe 108. The lower surface 102C of the canister 102 is located lower than the outlet 108B and higher than the drain hole 112A. A check valve 113 is provided at the drain hole 112A.

The vehicle 1A thus preferably includes the same structure as the vehicle 1 in regard to the canister 102. Therefore, as with the vehicle 1, entry of water into the canister 102 is able to be significantly reduced or prevented with the vehicle 1A as well.

Although preferred embodiments of the present invention have been described above, the present invention is not restricted to the contents of these preferred embodiments and various modifications are possible within the scope of the present invention.

Although in the preferred embodiments described above, two seats 5 are preferably aligned in the right-left direction, three or more seats 5 may be aligned in the right-left direction.

Each of the vehicles 1 and 1A preferably includes the pair of front wheels 2L and 2R and the pair of rear wheels 3L and 3R. However, a vehicle according to a preferred embodiment of the present invention may include two or more pairs of front wheels 2 and may include two or more pairs of rear wheels 3.

Although the vehicles 1 and 1A are preferably recreational off-road vehicles, vehicles according to other preferred embodiments of the present invention may be utility vehicles of any category. A general utility vehicle includes a frame structure and vehicle wheels suitable for off-road travel.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   at least one seat located such that a plurality of occupants are able to sit side by side in a right-left direction of the vehicle;
   an engine;
   a fuel tank that stores fuel for the engine and located lower than a seat surface of the at least one seat;
   a canister connected to the fuel tank via a gas pipe to adsorb evaporated gas generated by evaporation of the fuel inside the fuel tank;
   a breather pipe including an inlet connected to the canister, and an outlet located higher than the seat surface of the at least one seat and open to the atmosphere; and
   a drainpipe including a drain hole located lower than the outlet, and branching from the breather pipe.

2. The vehicle according to claim 1, wherein the breather pipe extends upward from a branching position with respect to the drainpipe; and
   the outlet is adjacent to an upper end of the breather pipe.

3. The vehicle according to claim 2, further comprising:
   an intake passage including an air inlet to supply air taken in from the air inlet to the engine; wherein
   the outlet is located at a same or substantially a same height position as the air inlet or a position higher than the height position of the air inlet.

4. The vehicle according to claim 1, further comprising a check valve that prevents backflow into the drainpipe from the drain hole.

5. The vehicle according to claim 1, wherein a lower surface of the canister is located lower than the outlet and higher than the drain hole;
   the inlet is connected to the lower surface of the canister;
   the drainpipe extends downward from a branching position with respect to the breather pipe; and
   the drain hole is located at a lower end of the drainpipe and faces the ground.

6. The vehicle according to claim 1, further comprising a shutoff valve that shuts off the gas pipe in response to the vehicle tilting by a predetermined angle or more with respect to a vertical direction.

7. The vehicle according to claim 6, wherein the shutoff valve is located higher than the fuel tank.

8. The vehicle according to claim 7, wherein the shutoff valve is located higher than the canister.

9. The vehicle according to claim 7, wherein the shutoff valve is located higher than the seat surface of the at least one seat.

10. The vehicle according to claim 1, further comprising a purge pipe connected to the canister to supply evaporated gas inside the canister to the engine.

11. The vehicle according to claim 1, wherein at least a portion of the fuel tank overlaps with the at least one seat in a plan view of the vehicle.

12. The vehicle according to claim 11, wherein the engine is located at a center or substantially a center of the vehicle in the right-left direction and lower than the seat surface of the at least one seat.

13. The vehicle according to claim 1, further comprising:
   a cylindrical frame including an opening and defining a vehicle body; wherein
   the outlet is located inside the cylindrical frame.

14. The vehicle according to claim 13, further comprising a dash panel located farther forward than a backrest of the at least one seat and covering a portion of the breather pipe from a rear.

15. The vehicle according to claim 14, wherein the dash panel covers at least a portion of the cylindrical frame from the rear.

16. The vehicle according to claim 14, wherein the at least one seat includes two seats aligned in the right-left direction, and
   the vehicle further comprises a center console located between the two seats and covering a portion of the breather pipe from above.

17. The vehicle according to claim 16, wherein the center console covers the canister from above.

18. The vehicle according to claim 14, wherein the engine is aligned with the fuel tank in the right-left direction.

19. The vehicle according to claim 1, wherein the canister is located farther rearward than a backrest of the at least one seat.

20. The vehicle according to claim 19, wherein the engine is located farther rearward than the fuel tank.

\* \* \* \* \*